(12) United States Patent  
Bahrami et al.

(10) Patent No.: US 11,526,336 B2  
(45) Date of Patent: Dec. 13, 2022

(54) COMMUNITY-ORIENTED, CLOUD-BASED DIGITAL ANNEALING PLATFORM

(71) Applicant: FUJITSU LIMITED, Kawasaki (JP)

(72) Inventors: Mehdi Bahrami, Santa Clara, CA (US); Wei-Peng Chen, Fremont, CA (US); Oussama Chafiqui, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/202,096

(22) Filed: Mar. 15, 2021

(65) Prior Publication Data

US 2022/0291906 A1    Sep. 15, 2022

(51) Int. Cl.
| | |
|---|---|
| *G06F 8/41* | (2018.01) |
| *H04L 9/40* | (2022.01) |
| *G06F 9/451* | (2018.01) |
| *G06F 17/10* | (2006.01) |

(52) U.S. Cl.
CPC .............. *G06F 8/41* (2013.01); *G06F 9/451* (2018.02); *G06F 17/10* (2013.01); *H04L 63/102* (2013.01); *H04L 63/105* (2013.01)

(58) Field of Classification Search
CPC . G06F 8/41; G06F 9/451; G06F 17/10; H04L 63/102; H04L 63/105
USPC ................................. 717/140–155, 104–120
See application file for complete search history.

(56) References Cited

U.S. PATENT DOCUMENTS

| | | | | |
|---|---|---|---|---|
| 6,289,507 | B1 * | 9/2001 | Tanaka ..................... | G06F 8/443 717/155 |
| 6,418,398 | B1 * | 7/2002 | Dueck ..................... | H04L 45/14 705/7.41 |
| 6,463,582 | B1 * | 10/2002 | Lethin .................. | G06F 9/45504 717/138 |
| 6,502,237 | B1 * | 12/2002 | Yates .................. | G06F 9/45516 717/136 |
| 6,952,821 | B2 * | 10/2005 | Schreiber ...................... | 717/160 |

(Continued)

OTHER PUBLICATIONS

Simunic et al, "Source Code Optimization and Profiling of Energy Consumption in Embedded Systems", IEEE, pp. 193-198 (Year: 2000).*

(Continued)

*Primary Examiner* — Anil Khatri
(74) *Attorney, Agent, or Firm* — Maschoff Brennan

(57) ABSTRACT

Operations may include obtaining source code describing an optimization problem. The operations may include identifying problem parameters associated with the optimization problem such that a specialized computing system may be enabled to solve the optimization problem. The operations may include extracting one or more first parameters of the problem parameters from the source code. The operations may include identifying one or more second parameters of the problem parameters that are not included in the source code. A user may be prompted via a GUI for input relating to the one or more second parameters. The operations may include compiling the extracted first parameters and the user-provided second parameters as input parameters of the specialized computing system. The operations may include providing the input parameters to the specialized computing system such that the specialized computing system is able to solve the optimization problem.

18 Claims, 15 Drawing Sheets

(56) References Cited

U.S. PATENT DOCUMENTS

| | | | |
|---|---|---|---|
| 7,013,456 B1* | 3/2006 | Van Dyke | G06F 9/45533 |
| | | | 714/39 |
| 7,367,019 B2* | 4/2008 | Mak | G06F 8/423 |
| | | | 717/142 |
| 8,190,547 B2* | 5/2012 | Kirovski | G06F 17/11 |
| | | | 706/46 |
| 8,370,821 B2* | 2/2013 | Haber | G06F 9/4484 |
| | | | 717/157 |
| 8,762,951 B1* | 6/2014 | Kosche | G06F 11/3476 |
| | | | 717/127 |
| 8,924,539 B2* | 12/2014 | Ferris | G06F 9/5072 |
| | | | 709/224 |
| 9,738,403 B1* | 8/2017 | Augenstein | G06F 9/3887 |
| 10,152,454 B2 | 12/2018 | Karimi | |
| 10,275,423 B2* | 4/2019 | Ronagh | G06N 10/00 |
| 10,557,863 B2 | 2/2020 | Holmes | |
| 10,846,366 B1* | 11/2020 | Otterbach | G06F 17/17 |
| 11,188,044 B2* | 11/2021 | Kanda | G06N 3/0445 |
| 11,393,577 B2* | 7/2022 | Thomas | G16H 40/20 |

OTHER PUBLICATIONS

Davidson et al, "Code Selection through Object Code Optimization", ACM, pp. 505-526 (Year: 1984).*

Hulzen et al, "A Code Optimization Package for Reduce", ACM, pp. 163-170 (Year: 1989).*

Nahar et al, "Simulated Annealing and Combinatorial Optimization", IEEE, pp. 293-299 (Year: 1986).*

Yu et al, "Online Vehicle Routing With Neural Combinatorial Optimization and Deep Reinforcement Learning", IEEE, pp. 3806-3817 (Year: 2019).*

Smith et al, "Neural Techniques for Combinatorial Optimization with Applications", IEEE, pp. 1301-1318 (Year: 1998).*

Tang et al, "A Columnar Competitive Model for Solving Combinatorial Optimization Problems", IEEE, pp. 1568-1575 (Year: 2004).*

* cited by examiner

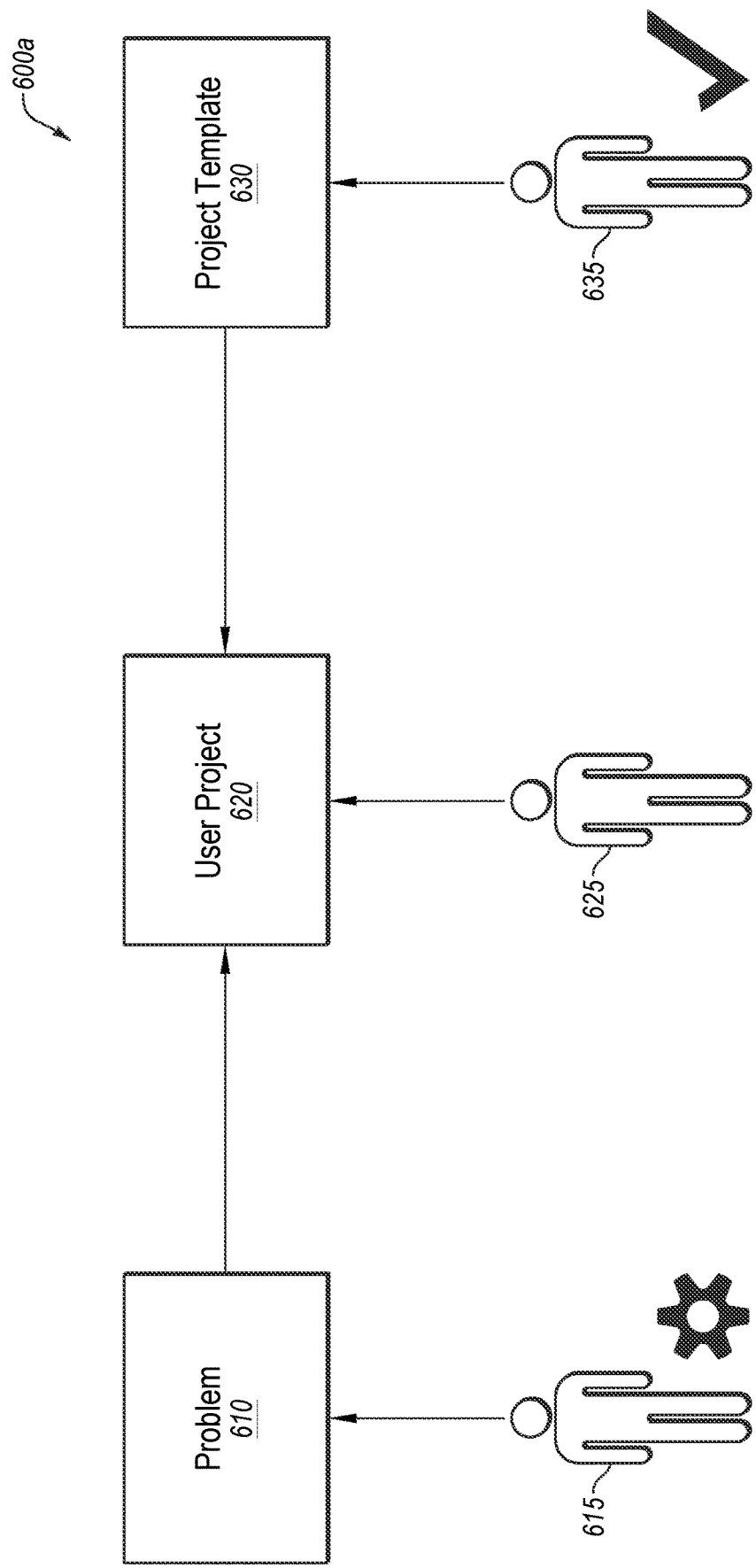

COMMUNITY-ORIENTED, CLOUD-BASED DIGITAL ANNEALING PLATFORM

The present disclosure generally relates to a community-oriented, cloud-based digital annealing platform.

BACKGROUND

Computing systems may be configured to solve mathematically represented problems. The computing system may calculate solutions to such problems more efficiently and/or more accurately than a human user could. The mathematically represented problems may include complex problems, such as optimization problems having a large number of variables. The optimization problem may be solved by finding an input value that returns a maximum value or a minimum value for a function that represents the optimization problem. Solving the optimization problem may be difficult because the time required to determine an effective solution to the optimization problem may increase exponentially depending on the number of variables that must be optimized to solve the optimization problem.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include obtaining source code describing an optimization problem. The operations may include identifying a plurality of problem parameters associated with the optimization problem such that a specialized computing system may be enabled to solve the optimization problem. The operations may include extracting one or more first parameters of the plurality of problem parameters from the source code. The operations may include identifying one or more second parameters of the plurality of problem parameters that are not included in the source code. A user may be prompted via a GUI for input relating to the one or more second parameters. The operations may include compiling the extracted first parameters and the user-provided second parameters as input parameters of the specialized computing system. The operations may include providing the input parameters to the specialized computing system such that the specialized computing system is able to solve the optimization problem.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 6A is a diagram representing a community platform in which one more advanced users may contribute to one or more optimization problems selected, customized, and/or executed by a non-expert user;

DETAILED DESCRIPTION

Figure 1:
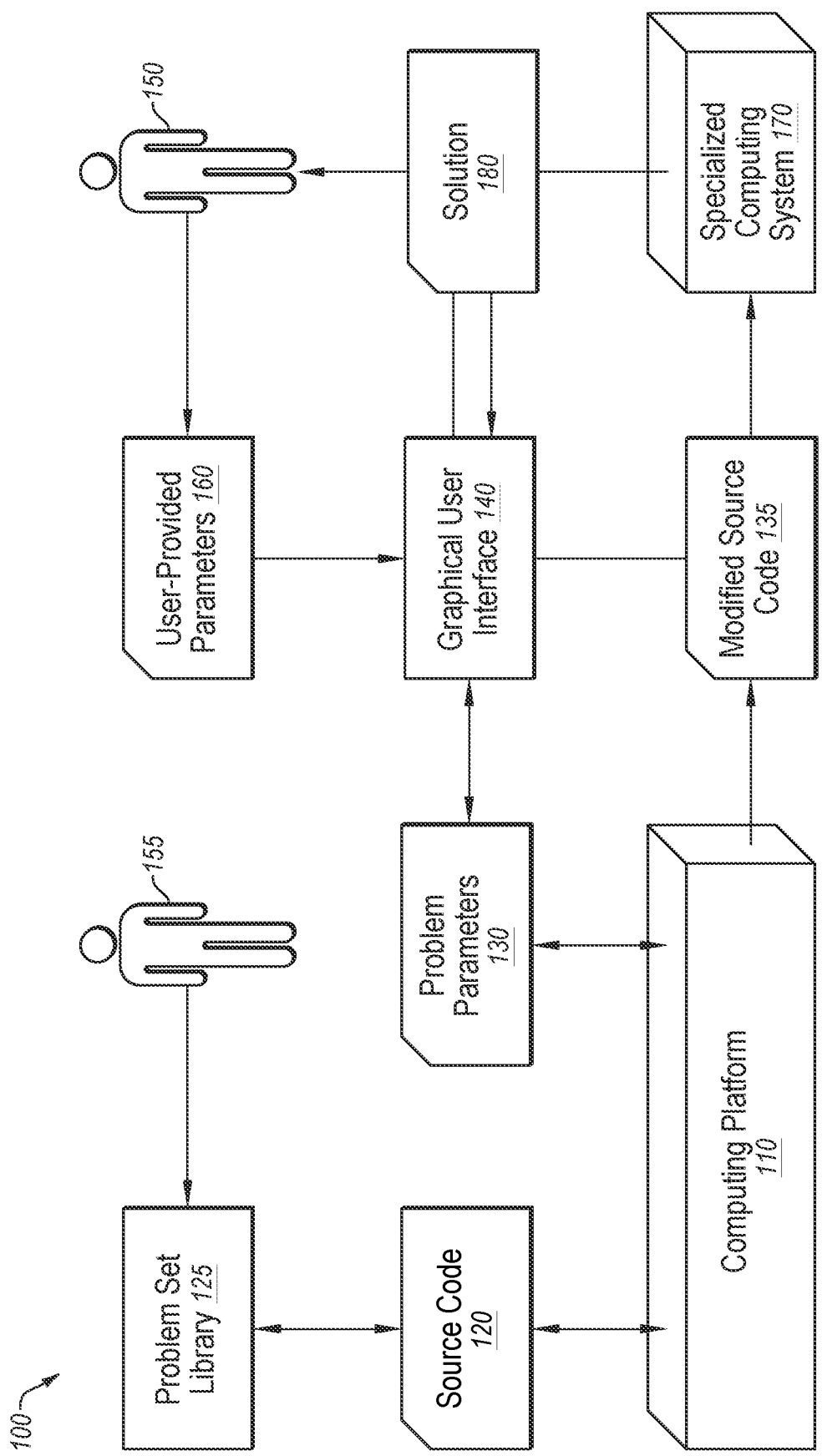
FIG. 1 is a diagram representing an example system for solving an optimization problem using a specialized computing system according to the present disclosure.

Many different types of problems, such as combinatorial optimization problems, may be efficiently solved using a quantum-computing approach. For example, a quantum computing system may be used to solve such problems. Additionally, a digital annealing system, which may be a classical computing system that has been developed to simulate quantum annealing through large-scale parallelization, may be used to solve such problems. However, such quantum-based systems (e.g., quantum computing systems and/or digital annealing systems) may not be available for solving such problems because such systems may be complicated to implement and/or include high operating costs. Further, quantum-based systems may require that optimization problems are presented and formatted in a certain manner and/or that certain information is provided in order to solve the optimization problems. As a result, even in instances in which a quantum-based system is available for solving a particular optimization problem, the information related to the particular optimization problem may not be correctly presented to the quantum-based system to solve the particular optimization problem.

The embodiments described in the present disclosure may relate to obtaining and formatting information for solving an optimization problem. For instance, as described in detail below, a computing platform may be configured to request certain parameters related to an optimization problem, obtain source code that is generated based on such parameters, obtain additional parameters, modify the source code according to the additional parameters. The finalized source code may include the information that may be needed to solve the problem and may be formatted in a manner that it may be used by a specialized computing system, such as a quantum—based system (e.g., a quantum computing system and/or a digital-annealing system) to solve the optimization problem.

Embodiments of the present disclosure may provide improvements over other computing systems for solving optimization problems. The computing platform may be configured to obtain and/or organize information relating to complex optimization problems such that solutions to the complex optimization problems are more readily available to a particular user. The computing platform may provide a lower cost and/or greater accessibility to computing one or more solutions to a particular optimization problem presented by the user. Some embodiments of the present disclosure may provide a user better access to specialized computing systems that the user would have previously been unable to utilize. Additionally or alternatively, embodiments of the present disclosure may facilitate more quickly solving computationally demanding optimization problems by organizing information related to the optimization problems in such a way that the optimization problems may be obtained and solved by a specialized computing system, such as a digital-annealing system. Functionality of a computing system implementing embodiments of the present disclosure may be improved by improving collection of input data relating to a particular optimization problem, facilitating community-driven improvement of the particular optimization problem by more than one user, and/or customization of existing optimization problems. Implementation of some embodiments of the present disclosure may preserve computing resources and/or improve computing solutions to the particular optimization problem.

Embodiments of the present disclosure are explained with reference to the accompanying figures.

FIG. 1 is a diagram representing an example system 100 related to an interface configured to facilitate the solving of an optimization problem using a specialized computing system, according to one or more embodiments of the present disclosure. In some embodiments, the system 100 may include a computing platform 110, a GUI 140, and a specialized computing system 170.

The computing platform 110 may include code and routines configured to enable a computing system to perform one or more operations. Additionally or alternatively, the computing platform 110 may be implemented using hardware including a processor, a microprocessor (e.g., to perform or control performance of one or more operations), a field-programmable gate array (FPGA), or an application-specific integrated circuit (ASIC). In some other instances, the computing platform 110 may be implemented using a combination of hardware and software. In the present disclosure, operations described as being performed by the computing platform 110 may include operations that the computing platform 110 may direct a corresponding system to perform.

The computing platform 110 may obtain and/or organize information about the optimization problem such that the optimization problem may be solved by the specialized computing system 170. In some embodiments, the computing platform 110 may be configured to gather information related to a problem to be solved. For example, the computing platform 110 may present to a first user 150, via the GUI 140, an interface for selection of a particular type of optimization problem to be solved and/or for certain problem parameters 130 related to the selected optimization problem. In some embodiments, the selected problem and/or provided problem parameters 130 may be included in user-provided information 160, which may be obtained by the computing platform 110.

In these or other embodiments, the computing platform 110 may be configured to obtain source code 120 related to the selected problem based on the initial user-provided information 160. The initial user-provided information 160 may correspond to one or more code templates, which may be obtained by the computing platform 110. The computing platform 110 may be configured to provide the code templates to a second user 155, who may generate the source code 120 based on the code templates. The source code 120 generated by the second user 155 may be obtained by the computing platform 110 and/or stored in a problem set library 125 in some embodiments. Additionally or alternatively, the computing platform 110 may obtain the code templates and/or the source code 120 from the problem set library 125. In these or other embodiments, the computing platform 110 may select the code template and/or the source code 120 from the problem set library 125 based on the code template and/or the source code 120 corresponding to the selected problem indicated in the initial user-provided information 160.

The source code 120 initially provided may be formatted in a manner to help facilitate solving of the selected optimization problem by the specialized computing system 170 by organizing and formatting information needed to solve the optimization problem (e.g., the problem parameters 130) in a programming language that may allow for solving of the optimization problem by the specialized computing system 170. Further, the source code 120 initially provided may include the problem parameters 130 that may be initially included in the user-provided information 160. However, the source code 120 may be lacking information related to all of the different problem parameters 130 that may be needed to solve the selected optimization problem.

The problem parameters 130 may include problem parameters having known parameter values and/or problem parameters without parameter values. In some embodiments, the computing platform 110 may identify and extract a number of problem parameters 130 based on the obtained source code 120. In these and other embodiments, the computing platform 110 may identify parameter values associated with one or more of the identified problem parameters 130 to determine which of the problem parameters 130 have known parameter values. Remaining problem parameters 130 for which no known parameter values are identified from the source code 120 may be categorized by the computing platform 110 as problem parameters without parameter values. In these and other embodiments, the problem parameters 130 without parameter values may be presented to a user, such as the first user 150, via the GUI 140 such that the user may specify user-provided information 160 including parameter values for the problem parameters 130.

The computing platform 110 may obtain the user-provided information 160 including the parameter values. In some embodiments, the computing platform 110 may modify the source code 120 associated with the selected optimization problem based on the additional user-provided information 160.

For example, the computing platform 110 may populate portions of the source code 120 that correspond to the additional user-provided information 160 and that were missing information. Additionally or alternatively, the computing platform 110 may update portions of the source code 120 in response to the additional user-provided information 160 changing one or more previously entered problem parameters 160.

In some embodiments, the computing platform 110 may provide the modified source code 120 to the second user 155. In these or other embodiments, the second user 155 may make more changes to the modified the source code 120 based on the updated problem parameters 160. The source code 120 as modified by the second user 155 may be obtained by the computing platform 110, which may then analyze this version of the source code 120 to determine, based on the analysis, whether more problem parameters or changes to the problem parameters may be requested from the first user 150 via the GUI 140. In these and other embodiments, generating and/or modifying source code 120 based on user-provided information 160 and requesting additional user-provided information 160 based on the source code 120 may be an iterative and/or collaborative process involving the first user 150 and/or the second user 155.

Upon determination that the source code 120 includes the information needed to solve the selected problem (e.g., a determination that needed problem parameters 160 are included in the source code 120), the modified source code, such as modified source code 135, may be sent to the specialized computing system 170. In some embodiments, the modified source code 135 may include mathematical formulae relating to the selected problem, values for one or more problem parameters associated with the selected problem, etc. The specialized computing system 170 may determine one or more solutions to the selected problem based on the modified source code 135.

In some embodiments, the specialized computing system 170 may include one or more software packages and computing units (not shown) as described in further detail below in relation to FIG. 4. The computing units may be configured to determine solutions to a particular problem based on input formatted in a specific manner. As such, the software packages may facilitate reformatting of the modified source code 135 for input to the computing units.

In some embodiments, the computing platform 110 may identify and import dependencies included in the source code 120. The source code 120 may include one or more dependencies referencing source code not included in the source code 120. For example, the source code 120 may import functions from a source code library, but the associated source code may not be included in the source code 120. In such an example, the source code 120 may not include enough information to successfully solve an optimization problem even with all problem parameters 130 defined because the source code of the dependencies are not included in the source code 120. In some embodiments, the dependencies may be included in a data storage that the computing platform 110 may reference to identify and retrieve source code relating to the dependencies. Additionally or alternatively, the source code 120 and the source code portions corresponding to dependencies included in the source code 120 may be extracted as a list of defined classes such that the computing platform 110 may reference the extracted classes to run the source code 120. Identification and extraction of dependencies is described in further detail below in relation to FIG. 2.

The GUI 140 may be configured to obtain the user-provided information 160 from the first user 150 relating to a particular optimization problem that the first user 150 may be interested in solving. The user-provided information 160 may facilitate identification and/or writing of source code 120, such as by the second user 155, describing the particular problem. In some embodiments, the GUI 140 may include a front-end website with which the first user 150 may interact. The GUI 140 may provide a point-of-access for the first user 150 to input and/or receive problem parameters about one or more optimization problems in a guided manner relative to the source code 120. The GUI 140 may display a template for an optimization problem, and the problem parameters 130 extracted from the source code 120 may be used to fill out aspects of the template. The GUI 140 may display the problem parameters 130 such that the first user 150 may review the problem parameters 130 to better understand the optimization problem. For example, the GUI 140 may include one or more particular fields for the problem title, the problem description, the mathematical formulae, the input parameters, etc. Problem parameters without known parameter values may be included as blank fields.

The GUI 140 may include fillable fields with which the user 150 may interact such that problem parameters provided in the fillable fields may be used to further define the optimization problem. The fillable fields may correspond to the problem parameters without known parameter values. Additionally or alternatively, the fillable fields may correspond to the problem parameters having parameter values, and the input parameters 160 provided by the user 150 may update said parameter values in the source code 120. Further, although not explicitly illustrated in FIG. 1 or discussed in detail, in some embodiments, the second user 155 may modify the source code 120 and provide feedback and input via the GUI 140. In these or other embodiments, the GUI 140 may be configured to present information and such to the second user 155 in a different manner than the first user 150 according to the type of information provided to and received from the second user 155.

The specialized computing system 170 may include code and routines configured to enable a computing system to perform one or more operations. Additionally or alternatively, the specialized computing system 170 may be implemented using hardware including a processor, a microprocessor (e.g., to perform or control performance of one or more operations), a field-programmable gate array (FPGA), or an application-specific integrated circuit (ASIC). In some other instances, the specialized computing system 170 may be implemented using a combination of hardware and software. In the present disclosure, operations described as being performed by the specialized computing system 170 may include operations that the specialized computing system 170 may direct a corresponding system to perform. The specialized computing system 170 may be configured to perform a series of operations with respect to the information related to the optimization problem, such as the modified source code 135 based on the problem parameters 130 extracted from the source code 120 and/or the user-provided parameters 160 obtained from the first user 150.

The specialized computing system 170 may include a computing system configured to solve complex optimization problems, such as a digital-annealing system. The specialized computing system 170 may be configured to obtain parameters relating to the optimization problem that the first user 150 is trying to solve and determine one or more solutions 180 to the optimization problem. The computing platform 110 may aggregate parameters identified from the source code 120 and/or user-provided parameters via the GUI 140 and send the parameters included in the modified source code 135 to the specialized computing system 170. The solutions 180 may be returned to the computing platform, which may display, via the GUI 140, the solutions 180 to the first user 150 and/or the second user 155.

In some embodiments, the specialized computing system 170 may include a digital-annealing system based on quantum-computing approaches. Existing quantum-computing systems may be very expensive and/or difficult to operate. The digital-annealing system may provide a less costly and/or complicated computing system for solving optimization problems. Additionally or alternatively, the digital-annealing system may be communicatively coupled to the computing platform 110, such as via a cloud-based computing platform. As such, the digital-annealing system may be configured to obtain problem parameters extracted and/or aggregated by the computing platform 110.

Modifications, additions, or omissions may be made to the system 100 without departing from the scope of the disclosure. For example, the designations of different elements in the manner described is meant to help explain concepts described herein and is not limiting. For instance, in some embodiments, the computing platform 110, the GUI 140, and the specialized computing system 170 are delineated in the specific manner described to help with explaining concepts described herein but such delineation is not meant to be limiting. Further, the system 100 may include any number of other elements or may be implemented within other systems or contexts than those described.

Figure 2:
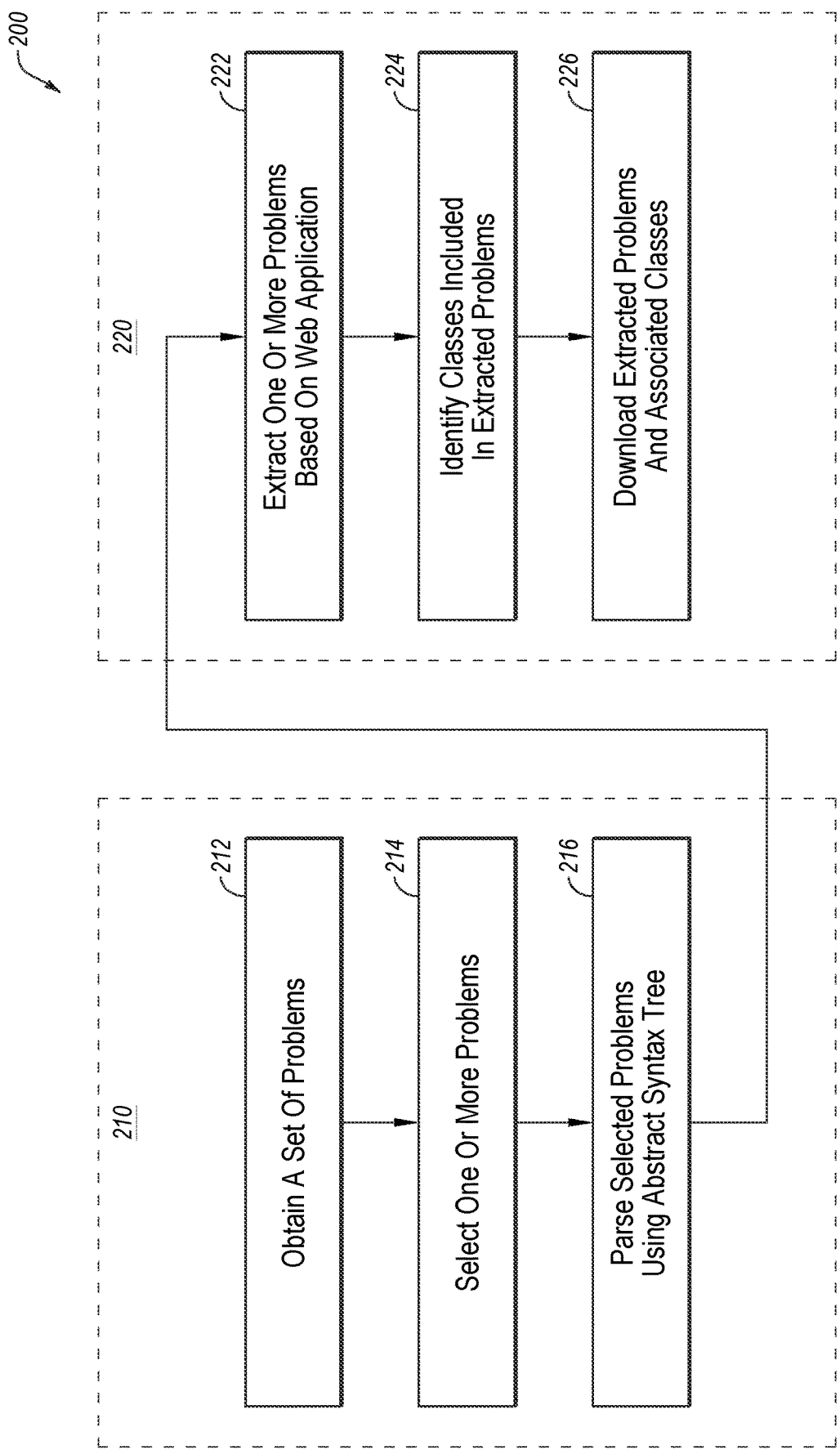
FIG. 2 is a flowchart of an example method of identifying and extracting dependencies relating to one or more optimization problems according to the present disclosure.

FIG. 2 is a flowchart of an example method 200 of identifying and extracting dependencies relating to one or more optimization problems according to the present disclosure. In some embodiments, the method 200 may include an offline process 210 and/or an online process 220. The method 200 may be performed by any suitable system, apparatus, or device. For example, the computing platform 110, the GUI 140, and/or the specialized computing system 170 may perform one or more operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may include the offline process 210 and/or the online process 220. In some embodiments, the offline process may include blocks 212, 214, and/or 216. In some embodiments, the offline process 210 may include identifying and storing a number of classes and/or dependencies included in a set of optimization problems. In some embodiments, the online process 220 may include generating one or more downloadable packages for a user in which the downloadable packages include dependencies associated with one or more optimization problems identified by the user.

At block 212, a set of optimization problems may be obtained. The set of optimization problems may include optimization problems included in one or more pieces of source code, such as the source code 120. Additionally or alternatively, the set of optimization problems may include one or more optimization problems identified in a problem set library, such as the problem set library 125.

At block 214, one or more of the optimization problems may be selected. In some embodiments, the optimization problems may be selected automatically based on inclusion of references to external source code included in the source code associated with the optimization problems. Additionally or alternatively, selection of the optimization problems may be based on one or more choices made by a user.

At block 216, the selected optimization problems may be parsed using an abstract syntax tree (AST) to identify one or more classes and/or relations between classes. The AST may map structural and/or content-related details included in the source code associated with the selected optimization problems, such as variables, conditions, classes, etc. using a tree representation. In some embodiments, relations between one or more classes may be determined based on the mapping of the details of the selected optimization problems such that dependencies between classes included in the selected optimization problems may be identified. In these and other embodiments, the dependencies may be organized based on sources and/or classes associated with the dependencies and stored in a data storage.

At block 222, one or more of optimization problems included in a web application IDE may be extracted. In some embodiments, the web application IDE may be based on source code and/or include information related to the optimization problems. For example, the web application IDE may include a JUPYTER NOTEBOOK™, a GOOGLE CORELAB™, etc. describing the optimization problems. Extraction of the optimization problems may include providing the source code associated with the optimization problems for analysis using the AST.

At block 224, classes included in the extracted optimization problems may be identified. In some embodiments, identification of the classes included in the optimization problems may be facilitated by using the AST as described above in relation to block 216. Additionally or alternatively, dependencies associated with the extracted optimization problems may be identified by a user.

At block 226, the extracted optimization problems and the associated dependencies may be downloaded. In some embodiments, the dependencies associated with the extracted optimization problems may be found in the data storage in which the dependencies related to the problems selected at block 214 are stored. In these and other embodiments, the source code corresponding to the extracted optimization problems and/or the source code corresponding to the associated dependencies may be downloaded, such as by a user.

Figure 3:
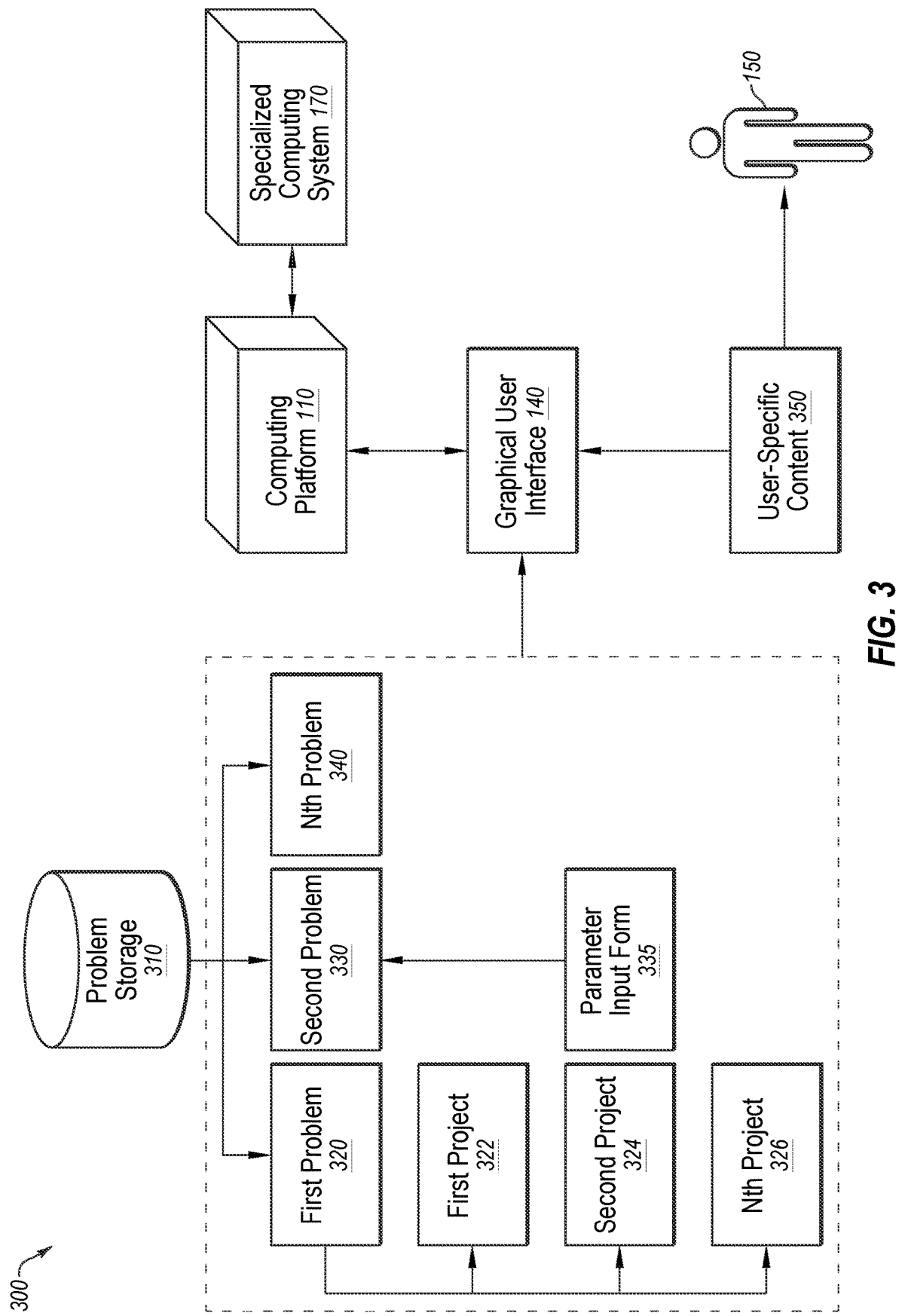
FIG. 3 is a diagram representing an example system for storage and/or presentation of one or more optimization problems according to the present disclosure.

FIG. 3 is a diagram representing an example system 300 for storage and/or presentation of one or more optimization problems according to the present disclosure. In some embodiments, the system 300 may include a problem storage 310, the computing platform 110, and/or the specialized computing system 170. The computing platform 110 may obtain problem parameters about one or more optimization problems, such as a first problem 320, a second problem 330, an Nth problem 340, etc., from the problem storage 310. In these and other embodiments, the computing platform 110 may obtain and/or output information associated with the optimization problems to the first user 150, via the GUI 140, based on analysis of the optimization problems by the specialized computing system 170.

In some embodiments, the problem storage 310 may include one or more data storages configured to store problem parameters associated with the optimization problems. For example, one or more problem parameters describing the first problem 320, the second problem 330, and/or the Nth problem 340 may be included in the problem storage 310. Additionally or alternatively, one or more parameter input forms 335 may be stored in the problem storage 310. The parameter input forms 335 may include one or more fillable fields for inputting missing parameter values required and/or helpful for solving the associated optimization problem.

For example, a particular optimization problem may be a resource-allocation optimization problem, such as the knapsack problem. In this example, a knapsack with a maximum weight capacity may hold one or more objects, each of the objects having an assigned weight and value. A particular solution to the knapsack problem may be represented by a set of objects that may be held in the knapsack based on the weight of each object and the maximum weight capacity of the knapsack. A quality of the particular solution may be calculated based on the value assigned to each of the objects included in the set. In this example, the problem storage 310 may already include parameters describing the knapsack problem, such as a problem title, a problem description, and/or mathematical formulae (e.g., for computing total weight, total value of objects included in a given set, etc.). Parameters identified as missing may include parameters such as a weight of a given object, a value of a given object, a maximum weight capacity of a given knapsack, etc. A particular parameter input form for the knapsack problem may include fillable fields identifying such parameters and/or prompting users to input the missing parameters.

In these and other embodiments, the parameters describing a particular optimization problem, such as the first problem 320, may include one or more projects related to the particular optimization problem. A project may include case-specific parameter values corresponding to the particular optimization problem. Returning to the previous example, a first project may include first weights for a number of objects, first values for the same objects, and a first maximum weight capacity for the given knapsack. A second project may include second weights for the objects, second values for the same objects, and a second maximum weight capacity for the given knapsack, in which the second weights, the second values, and the second maximum weight capacity may include the same and/or different numerical values from the first weights, the first values, and/or the first maximum weight capacity.

The problem parameters included in the problem storage 310 may be obtained by the GUI 140 and displayed to the first user 150. The computing platform 110 may identify the problem parameters relating to a number of optimization problems to be displayed to the user 150 based on phrases included in the source code associated with each of the optimization problems. For example, the computing platform 110 may be configured to display a list of problem titles included in the problem storage 310 to the user 150 from which the user 150 may select one or more particular optimization problems. In some embodiments, the list of problem titles may have been previously identified in a number of pieces of source code as described in further detail below in relation to FIGS. 7A and 7B.

The first user 150 may be prompted to select one or more optimization problems based on the problem parameters and/or to input information describing one or more particular optimization problems of interest to the first user 150 via the GUI 140. Problem parameters associated with the selected optimization problems may be obtained from the problem storage 310. In some embodiments, the computing platform 110 may be configured to display missing problem parameters associated with the selected optimization problems. Such missing problem parameters may be identified in the problem storage 310. For example, the second problem 330 may include missing problem parameters. The computing platform 110 may generate the parameter input form 335 corresponding to the second problem 330 to indicate which problem parameters are missing, and the parameter input form 335 may be displayed to a user who selects the second problem 330 via the GUI 140.

In some embodiments, the computing platform 110 may display different information to different users. Users accessing the computing platform 110 may have disparate levels of understanding with respect to source code, optimization problems, etc. The computing platform 110 may determine a level of understanding and/or access to the optimization problems of each user based on a profile associated with the user as described in further detail below in relation to FIG. 5. The parameters displayed to the user 150, the missing parameter values displayed by the GUI 140, and/or information relating to a solution to an optimization problem may be withheld or expanded based on the profile used to access the GUI 140 by the user 150.

The user 150 may provide to and/or obtain from the GUI 140 user-specific content 350. In some embodiments, the user-specific content 350 may include user-provided parameters, such as the user-provided input parameters 160 of FIG. 1. For example, the user 150 may be prompted to provide parameter values based on the parameter input form 335.

The computing platform 110 may provide to the specialized computing system 170 problem parameters relating to one or more optimization problems such that the specialized computing system 170 may provide a solution to the optimization problems as described above in relation to FIG. 1. The solution to the optimization problem may be returned to the computing platform 110 and displayed to the user via the GUI 140.

Modifications, additions, or omissions may be made to the system 300 without departing from the scope of the disclosure. For example, the designations of different elements in the manner described is meant to help explain concepts described herein and is not limiting. For instance, in some embodiments, the problem storage 310, the computing platform 110, and the specialized computing system 170 are delineated in the specific manner described to help with explaining concepts described herein but such delineation is not meant to be limiting. Further, the system 300 may include any number of other elements or may be implemented within other systems or contexts than those described.

Figure 4:
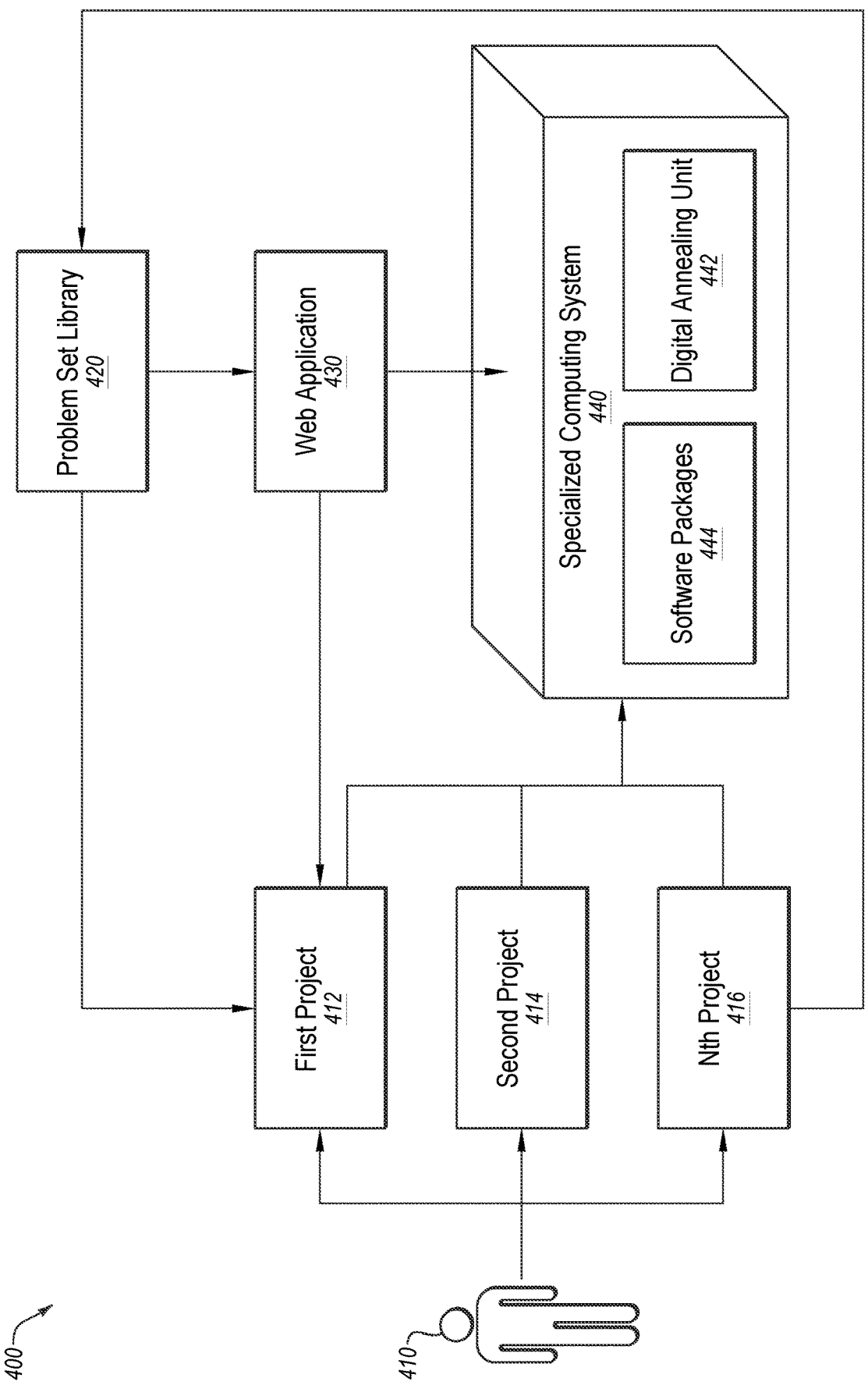
FIG. 4 is a diagram representing an example system for customizing workflow relating to one or more projects according to the present disclosure.

FIG. 4 is a diagram representing an example system 400 for customizing workflow relating to one or more projects according to the present disclosure. The system 400 may include a first project 412, a second project 414, and/or Nth projects 416 selected by a user 410. The projects 412-416 may be selected and/or customized via a web application 430, and the source code corresponding to the projects 412-416 may be imported from a problem set library 420. In some embodiments, the first project 412, the second project 414, and/or the Nth projects 416 as customized by the user 410 may be stored in the problem set library 420. Additionally or alternatively, customization of the first project 412, the second project 414, and/or the Nth projects 416 by the user 410 may update the source code associated with one or more of the optimization problems included in the problem set library 420.

In some embodiments, the web application and/or the projects 412-416 may be connectively coupled to a specialized computing system 440. In these and other embodiments, the specialized computing system 440 may include a digital annealing unit 442 and one or more software packages 444. The software packages 444 may include code and routines for formatting inputs to the specialized computing system 440, such as the modified source code 135 described in relation to FIG. 1, such that one or more of the digital annealing units 442 may determine one or more solutions based on the reformatted input.

For example, the software packages 444 may include the PYQUBO® software package, which may generate one or more quadratic unconstrained binary optimization (QUBO) models based on source code relating to one or more of the projects 412-416. The digital annealing units may provide obtain the QUBO models as inputs and determine solutions to the QUBO models. In these and other embodiments, the solutions to the QUBO models may correspond to solutions to the projects 412-416.

Modifications, additions, or omissions may be made to the system 400 without departing from the scope of the disclosure. For example, the designations of different elements in the manner described is meant to help explain concepts described herein and is not limiting. For instance, in some embodiments, the first project 412, the second project 414, the Nth projects 416, the problem set library 420, the web application 430, and the specialized computing system 440 are delineated in the specific manner described to help with explaining concepts described herein but such delineation is not meant to be limiting. Further, the system 400 may include any number of other elements or may be implemented within other systems or contexts than those described.

Figure 5:
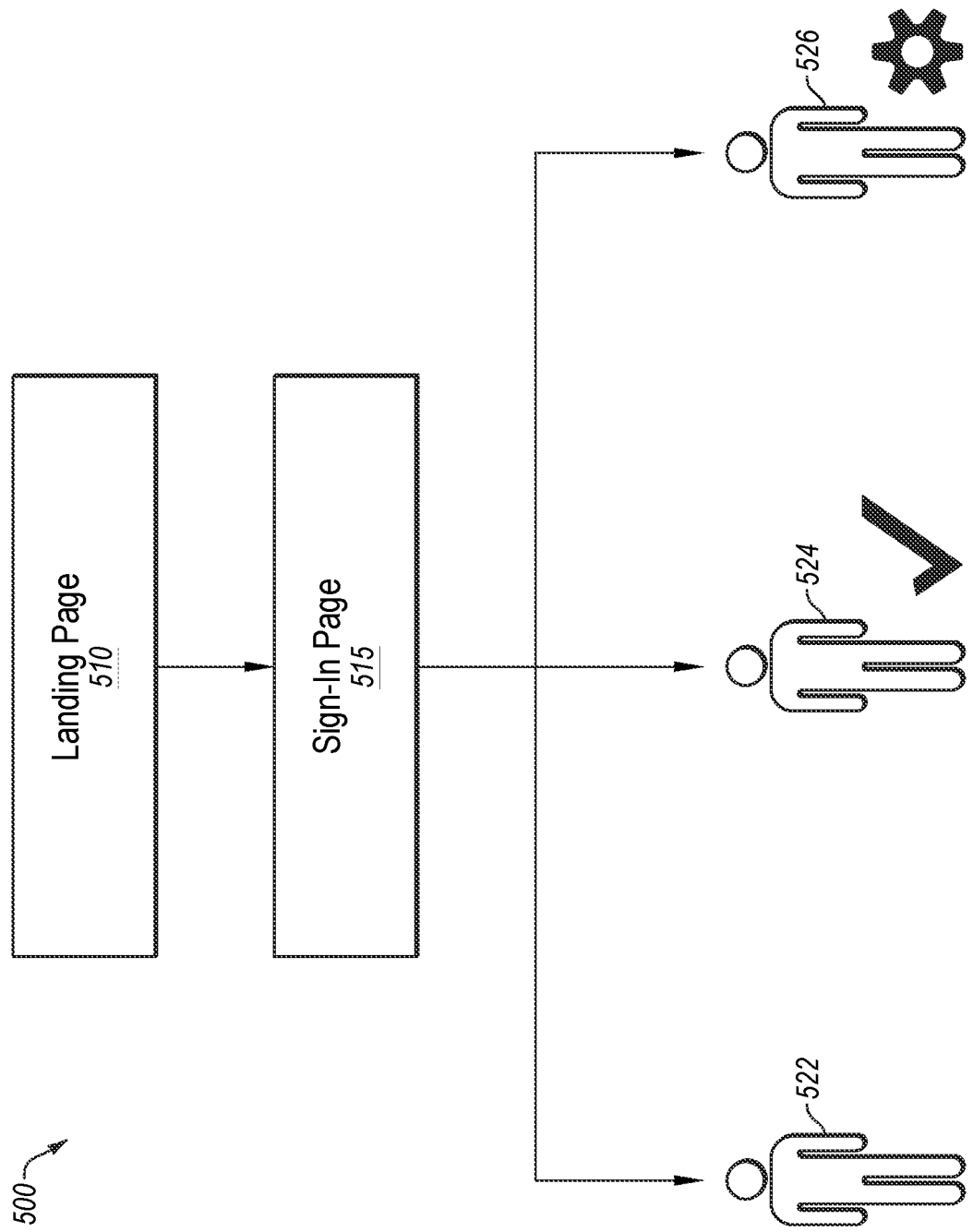
FIG. 5 is a diagram representing an example system for classification and/or permission setting for one or more users of the GUI according to the present disclosure.

FIG. 5 is a diagram representing an example system 500 for classification and/or setting permissions for one or more users accessing the GUI 140 according to the present disclosure. In some embodiments, the system 300 may include a front-end website including a landing page 510. In these and other embodiments, the front-end website may include a GUI, such as the GUI 140, and a user interacting with webpages included in the front-end website may be using the GUI 140. A user may access one or more webpages included in the front-end website via a sign-in page 515. In some embodiments, the landing page 510 may include a visual and/or a text prompt leading users to the sign-in page 515. The sign-in page 515 may include a first prompt for generating user credentials (e.g., a username and/or a password) for new users and/or a second prompt for inputting user credentials for existing users.

A user, such as the user 150, may be identified based on the user credentials the user inputs on the sign-in page 515. One or more profiles 522-526 may correspond to given user credentials such that users inputting the given user credentials accesses the corresponding profiles. In some embodiments, a first profile may include a regular-user profile 522. In these and other embodiments, a second profile may include an advanced-user profile 524, and a third profile may include an administrative-user profile 526.

In some embodiments, the regular-user profile 522 may be configured to access a list of optimization problems, such as via the GUI 140. A user operating the regular-user profile 522 may select one or more optimization problems included on the list of optimization problems. In these and other embodiments, the user operating from the regular-user profile 522 may be prompted by the GUI 140 for input parameters not included with the selected optimization problems. The user in these and other embodiments may tailor the selected optimization problems to one or more goals of the user based on the input parameters that the user provides. The GUI 140 may send the selected optimization problems and the user-provided input parameters to a specialized computing system to solve and display one or more solutions to the selected optimization problems to the user. In some embodiments, the user may save the optimization problems and the corresponding solutions, such as by downloading the optimization problems and/or the corresponding solutions as displayed by the GUI 140 (e.g., by taking a screenshot, converting the webpage into a particular file format, etc.). Additionally or alternatively, the optimization problems and/or the corresponding solutions may be saved and/or cached in relation to a particular profile such that the optimization problems as defined by the user and/or the corresponding solutions may be accessed during future use of the particular profile.

In some embodiments, the advanced-user profile 524 may be configured to contribute to the optimization problems. A user operating from the advanced-user profile 524 may be allowed to revise source code associated with one or more optimization problems, such as via a prompt displayed by the GUI 140. In some embodiments, the GUI 140 may display an interface through which the user may revise the source code. In some embodiments, revising the source code may affect a local change to the optimization problems only accessible by the user operating from the advanced-user profile 524. Additionally or alternatively, a computing platform may collect source-code revisions made by one or more users operating from advanced-user profiles 524, and the source code may be revised at a system-wide level such that the revised optimization problem is available to other users.

The administrative-user profile 526 may be configured to affect system-wide changes in relation to the GUI 140. In some embodiments, a user operating from the administrative-user profile 526 may add, delete, and/or edit other profiles. For example, a user operating from the administrative-user profile 526 may generate new user credentials, delete existing profiles, change permissions associated with an existing profile, delete stored projects and/or solutions, etc. Additionally or alternatively, a user operating from the administrative-user profile 526 may revise the source code on which the one or more optimization problems are based in the same and/or a similar manner as a user operating from the advanced-user profile 524.

Modifications, additions, or omissions may be made to the system 500 without departing from the scope of the disclosure. For example, the designations of different elements in the manner described is meant to help explain concepts described herein and is not limiting. For instance, in some embodiments, the landing page 510, the sign-in page 515, and the profiles 522-526 are delineated in the specific manner described to help with explaining concepts described herein but such delineation is not meant to be limiting. Further, the system 500 may include any number of other elements or may be implemented within other systems or contexts than those described.

Figure 6B:
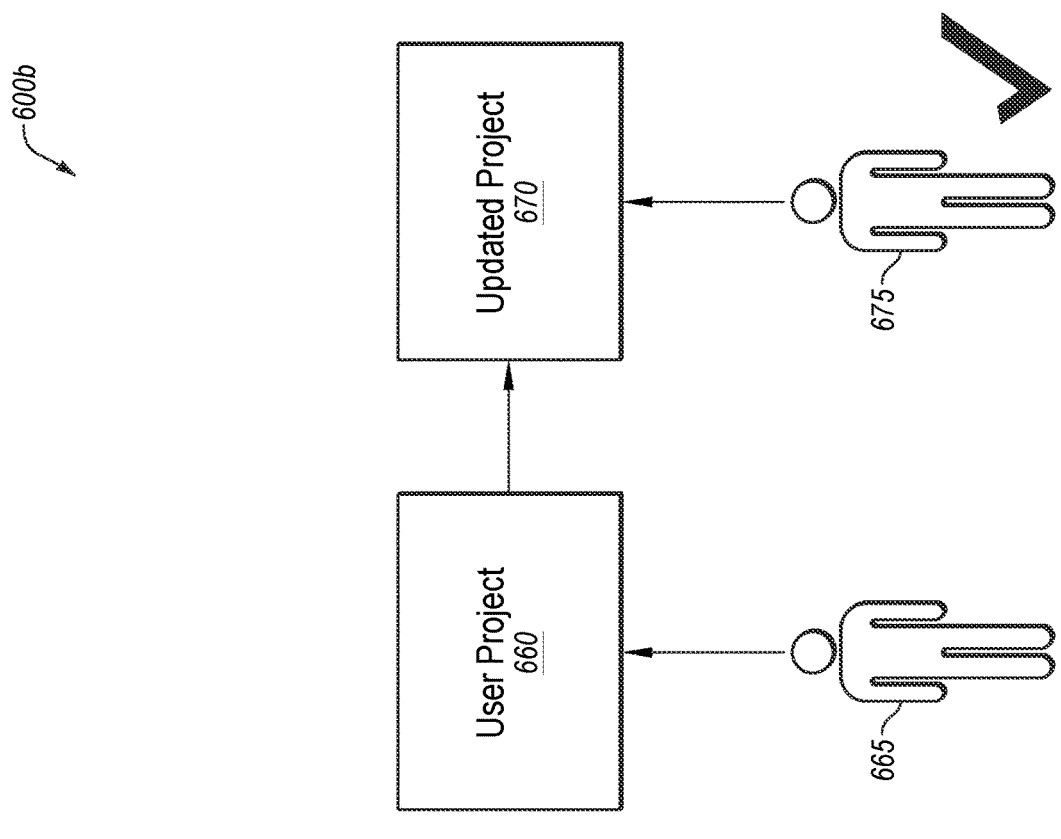
FIG. 6B is a diagram representing a community platform in which two or more users may collaborate on projects according to the present disclosure.
Figure 6B:
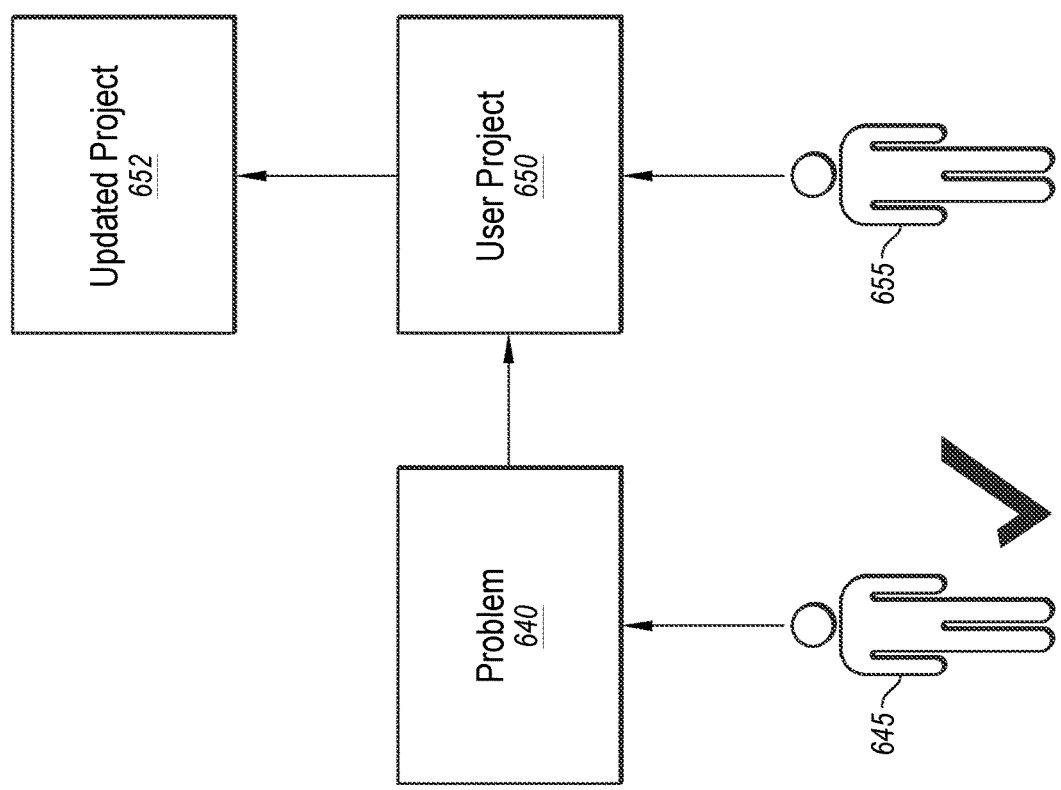
Figure 6C:
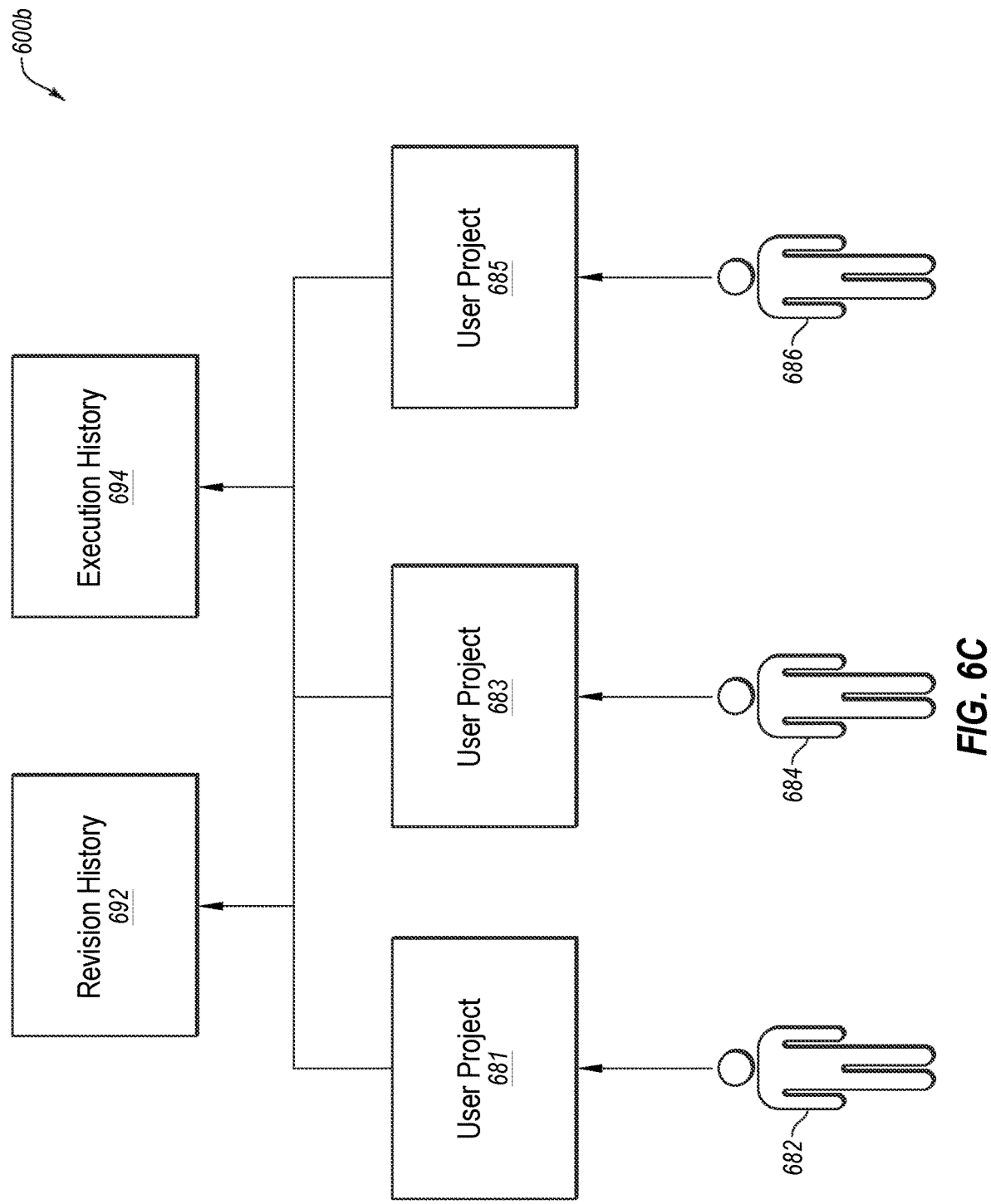
FIG. 6C is a diagram representing a community platform facilitating collaborative project revisions according to the present disclosure.

FIGS. 6A, 6B, and 6C are example embodiments illustrating community involvement between two or more users to generate and/or revise one or more problems.

FIG. 6A illustrates a community platform 600a in which one more advanced users may contribute to one or more problems via the community platform 600a that may be selected, customized, and/or executed by a non-expert user. In some embodiments, a first user 615 may generate a first problem 610. In some embodiments, the first user 615 may include a user operating from an administrative-user profile as described above in relation to FIG. 5. In these and other embodiments, the first user 615 may write and/or revise source code associated with the first problem 610.

In some embodiments, the community platform 600a may store the source code associated with the first problem 610 and present a list of problems to a second user 625, such as a user operating from the regular-user profile. The second user 625 may select the first problem 610 and customize the first problem 610 as a user project 620. In some embodiments, customization of the first problem 610 may be facilitated by the community platform 600a. For example, the community platform 600a may provide one or more fillable fields based on the first problem 610 in which the second user 625 may provide information about one or more problem parameters associated with the first problem 640. The community platform 600a may automatically update the source code associated with the first problem 610 based on the problem parameters specified by the second user 625 to generate source code associated with the user project 620. In these and other embodiments, the first user 615 may revise the source code associated with the first problem 610 and/or the user project 620 based on the information provided by the second user 625 over the community platform 600a. The community platform 600a may facilitate iterative and collaborative revisions to the user project 620 by the first user 615 and the second user 625.

Additionally or alternatively, a third user 635, such as a user operating from the advanced-user profile, may update and/or revise the source code associated with the first problem 610 to generate a project template 630 presentable to the second user 625 via the community platform 600a. The project template 630 may provide an information-collection format that a non-expert user may be able to easily understand relative to source code and/or web applications (e.g., a fillable form with fields for user-provided parameters). In these and other embodiments, the project template 630 may facilitate customization of the first problem 610 and be presented to the second user responsive to selection of the first problem 610 from the list of problems presented by the community platform 600a.

FIG. 6B illustrates a community platform 600b in which two or more users may collaborate on projects according to the present disclosure. In some embodiments, a fourth user 645 operating from the advanced-user profile and/or the administrative-user profile may write source code relating to a second problem 640, which may be imported by a fifth user 655 as a user project 650 over the community platform 600b. The fifth user 655 may customize and contribute to the user project 650 to generate an updated project 652. In some embodiments, the updated project 652 may be provided to the fourth user 645 over the community platform 600b such that the fourth user 645 may update the source code associated with the second problem 640. Additionally or alternatively, the community platform 600b may automatically update the source code associated with the second problem 640 based on the updated project 652.

In some embodiments, a sixth user 665 may select a problem, such as from a list of problems, and customize the problem to generate a user project 660. A seventh user 675 may collaborate with the sixth user 665 to improve the user project 660 by integrating source code and/or a library of source code available over the community platform 600b (such as source code included in a library available via the community platform 600b) into the user project 660 resulting in an updated project 670. In these and other embodiments, the source code integrated in the updated project 670 may provide more accurate algorithms, additional project customizability, and/or other improvements relative to the user project 660. The community platform 600b may store the updated project 670 and/or present the updated project 670 to other users.

FIG. 6C illustrates a community platform 600c facilitating collaborative project revisions according to the present disclosure. In some embodiments, an eighth user 684, a ninth user 685, and/or a tenth user 686 may be working on a user project 681, a user project 682, and/or a user project 683, respectively. Collaborative work may be performed on the user projects 681, 682, and/or 683 by documenting changes made to each user project in a revision history 692 available via the community platform 600c. In some embodiments, the changes made to each user project may be documented by each user and stored on the community platform 600c. Additionally or alternatively, the community platform 600c may automatically document revisions made to the user projects 681, 682, and/or 683 and store one or more versions of each user project 681, 682, and/or 683. In some embodiments, the revision history 692 may document the revisions made to each user project 681, 682, and/or 683 separately such that only the author-user of a particular user project may review the revision history 692 for the particular user project. For example, the revision history 692 of the user project 681 may be viewable to the eighth user 684 but not to the ninth user 685 and/or the tenth user 686. Additionally or alternatively, the revision history 692 may document the revisions made to each user project collectively such that one or more of the users may review the revision history 692.

In some embodiments, the community platform 600c may include an execution history 694 documenting a frequency with which a particular user project has been executed and/or which user has executed a particular user project. In some embodiments, the execution history 694 may be accessible to only the author-user of a particular user project. Additionally or alternatively, the execution history 694 may be accessible to one or more of the users.

Figure 7A:
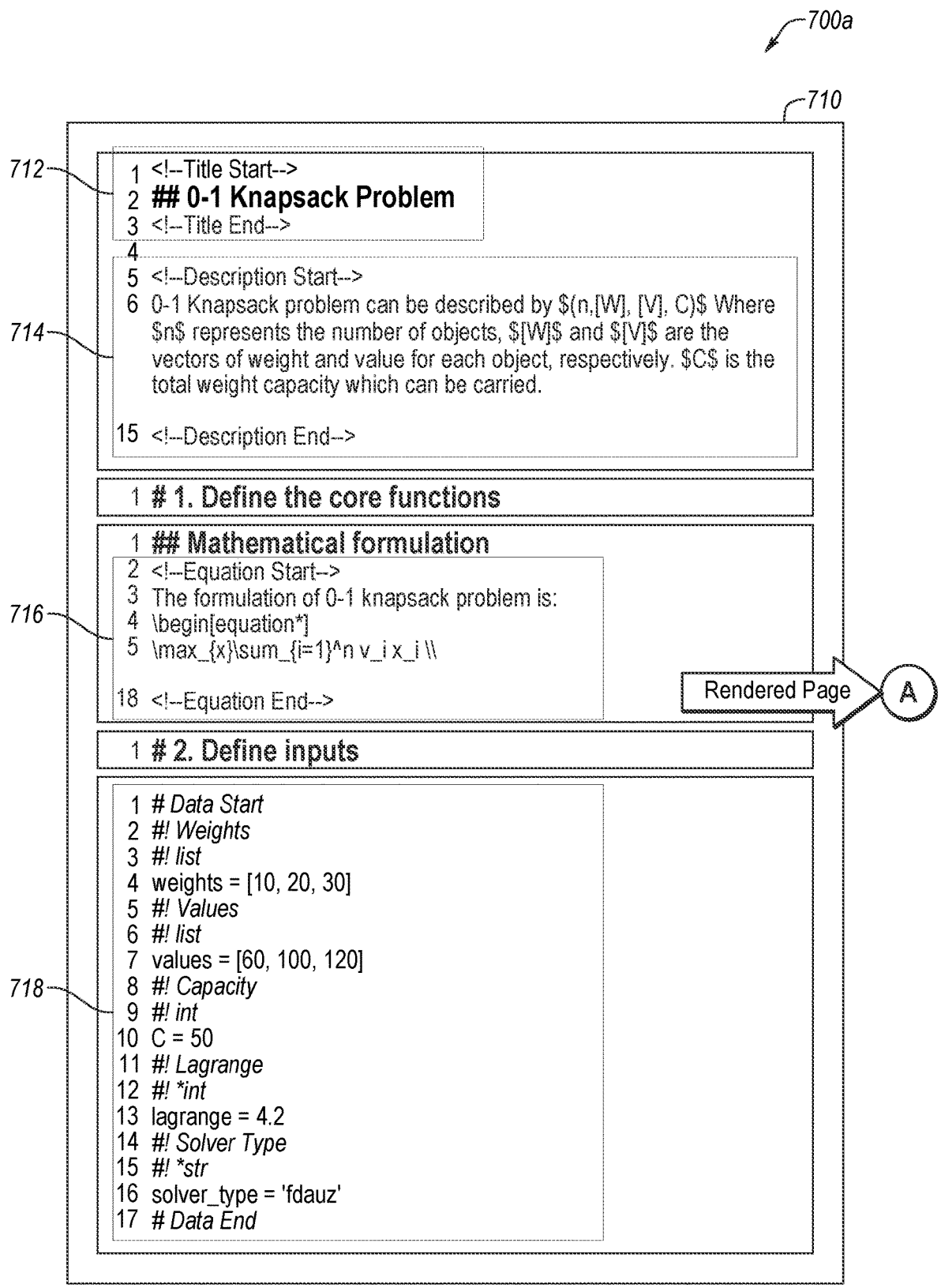
FIGS. 7A and 7B are illustrations of an example embodiment representing rendering of problem parameters extracted from source code in a web application integrated development environment (IDE) according to the present disclosure.
Figure 7B:
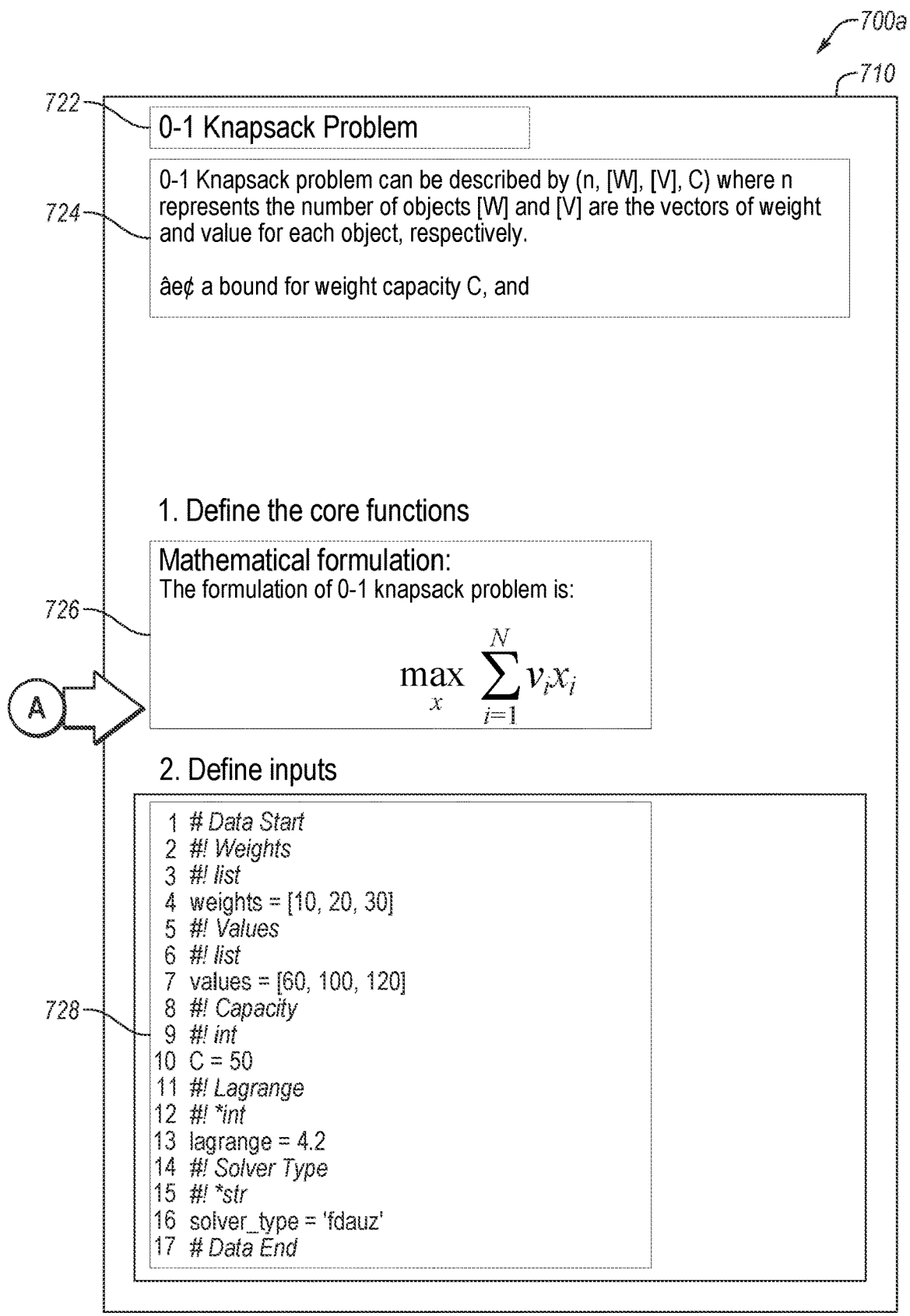

FIGS. 7A and 7B are illustrations of an example embodiment 700a representing rendering of parameters 712-718 extracted from source code 710 in a web application IDE 720 according to the present disclosure. The source code 710 may include one or more parameters 712-718, such as a problem title 712, a problem description 714, one or more mathematical formulae 716, and/or one or more input parameters 718. The source code 710 may be rendered in a web application, text document, webpage, etc., such as the web application IDE 720, to provide a visualization of the source code 710. The visualization of the source code 710 may improve understanding of the source code 710 by a user and/or facilitate revising the source code 710. In some embodiments, the web application IDE 720 may include one or more sections, such as a title section 722, a description section 724, a mathematical formulae section 726, and/or a parameter section 728, each of the sections of the web application IDE 720 corresponding to the parameters 712-718 included in the source code 710.

In some embodiments, rendering the source code 710 in the web application IDE 720 may include parsing the source code 710 to identify the parameters 712-718. In these and other embodiments, the source code 710 may include one or more annotation blocks identifying one or more lines of the source code 710 as including each of the parameters 712-718. For example, the source code 710 may include a first annotation block including a first comment stating "<!--Title Start-->," one or more particular lines of code below the first comment, and a second comment stating "<!--Title End-->" following the particular lines of code. In this example, the particular lines of code between the first comment and the second comment may be identified as the problem title 712. As another example, the problem description 714 may be identified by one or more lines of code interposed between a first description comment "<!--Description Start-->" and a second description comment "<!--Description End-->." As another example, the mathematical formulae 716 may be identified by one or more lines of code interposed between a first formula comment "<!--Equation Start-->" and a second formula comment "<!--Equation End-->." Identifying the input parameters 718 is described in further detail below in relation to FIG. 8.

The annotation blocks corresponding to one or more problem parameters may be identified by a computing platform, such as the computing platform 110, based on syntax included in each of the annotation blocks. In some embodiments, the computing platform 110 may be configured to identify a first sequence of symbols, characters, letters, etc. indicating a starting point of a particular annotation block and/or an ending point of the particular annotation block. For example, the computing platform 110 may be configured to recognize a sequence of four symbols in source code, "<!--", as an indicator that the line of source code in which the sequence of symbols appears is an annotation block. In some embodiments, the computing platform 110 may be configured to recognize a second sequence, a third sequence, etc. indicating additional information about the annotation block. Returning to the previous example, a string stating "Start" or "End" included in the line of source code on which the "<!--" appears may indicate the annotation block is the starting point or the ending point, respectively.

Figure 7C:
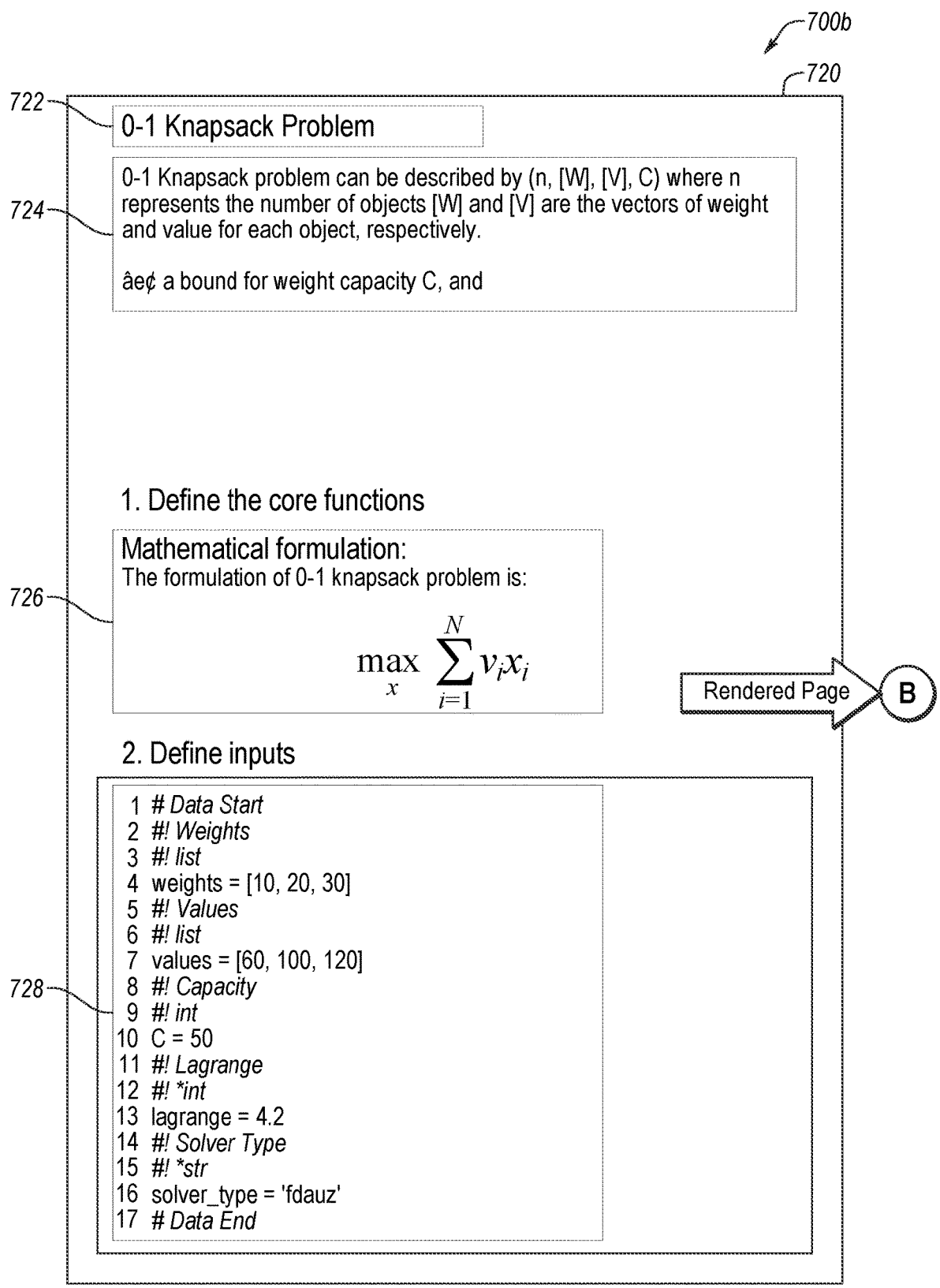
FIGS. 7C and 7D are illustrations of an example embodiment representing the problem parameters in a GUI according to the present disclosure.
Figure 7D:
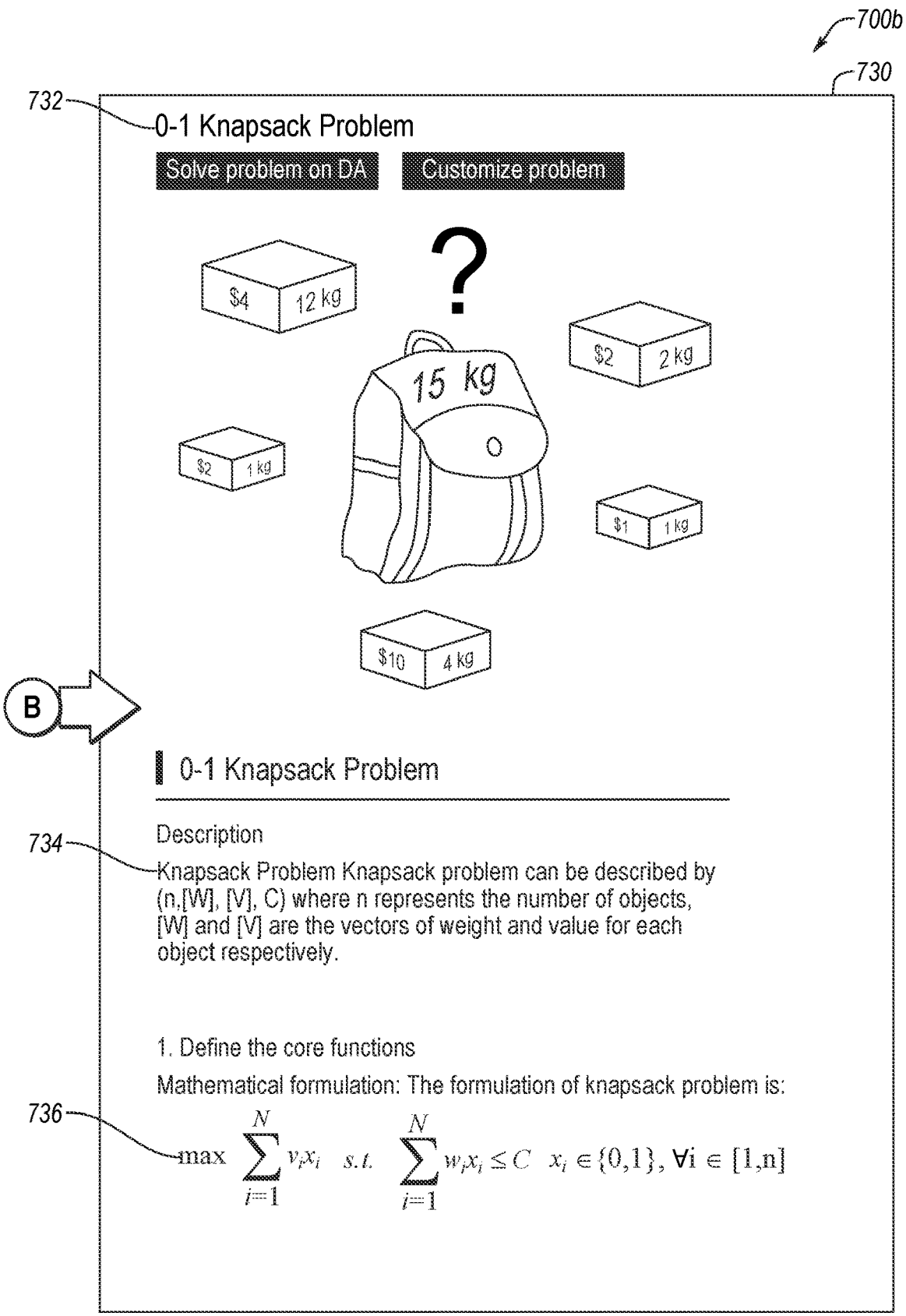

FIGS. 7C and 7D are illustrations of an example embodiment 700b representing the problem parameters in a GUI view 730 according to the present disclosure. The GUI view 730 in which the problem parameters are represented may include a static webpage and/or an interactive webpage. Additionally or alternatively, the GUI view 730 may be selected as a view of the optimization problem for users operating regular-user profiles.

In some embodiments, the GUI view 730 may be included as one or more webpages on a website. The GUI view 730 may include a webpage title 732 corresponding to the problem title 712 and/or the title section 722, a webpage description 734 corresponding to the problem description 714 and/or the description section 724, and/or one or more webpage mathematical formulae 736 corresponding to the mathematical formulae 716 and/or the mathematical formulae section 726. The website may be accessible to one or more users and include a landing page, such as the landing page 510 as described in relation to FIG. 5. Display of the GUI view 730 and/or contents included on the GUI view 730 may be customized and/or tailored based on preferences of a particular user viewing the GUI view 730. Such customization and/or tailoring of the GUI view 730 may be linked to a particular profile that the particular user may access, such as the regular-user profile 522. In these and other embodiments, the GUI view 730 may be displayed differently based on the type of profile viewing the GUI view 730. The GUI view 730 may display a first webpage for a user operating the regular-user profile 522, a second webpage for a user operating the advanced-user profile 524, and/or a third webpage for a user operating the administrative-user profile 526.

Figure 8:
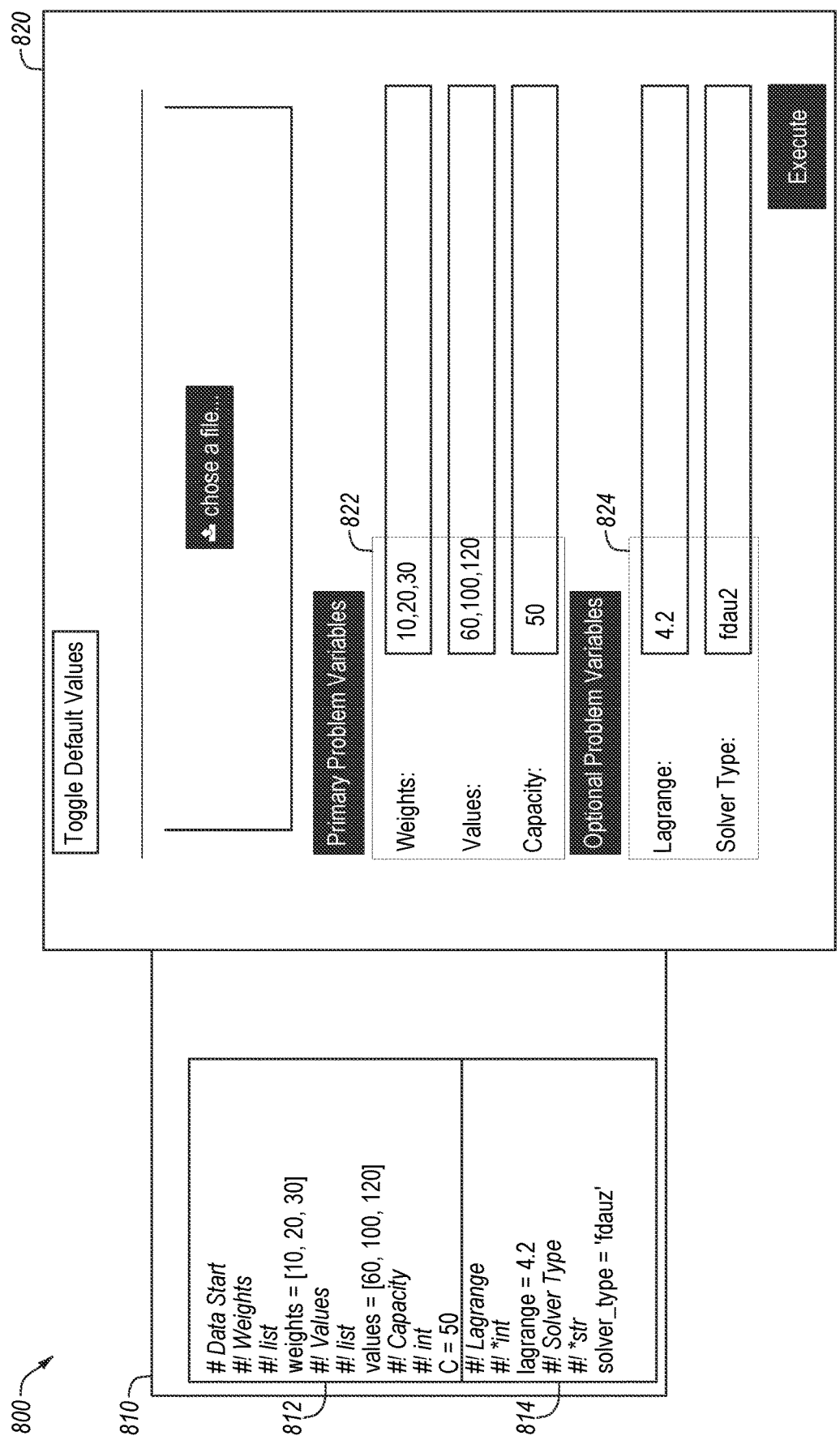
FIG. 8 is an illustration of an example embodiment representing selection and extraction of input values associated with a particular problem according to the present disclosure.

FIG. 8 is an illustration of an example embodiment 800 representing selection and extraction of parameter values associated with a particular optimization problem according to the present disclosure. The example embodiment 800 may include parameter source code 810, which may be represented as a fillable form 820. In some embodiments, the parameter source code 810 may include source code describing problem parameters, such as a problem-parameter source code section 812, and/or source code describing execution parameters, such as an execution-parameter source code section 814. In these and other embodiments, the problem-parameter source code section 812 may be displayed in the fillable form 820 as primary problem variables 822, and/or the execution-parameter source code section 814 may be displayed in the fillable form 820 as execution problem variables 824.

The problem parameters may include inputs that describe a particular optimization problem. For example, problem parameters associated with the knapsack problem may include weights assigned to each object, values assigned to each object, the capacity of the knapsack, etc. In some embodiments, the problem-parameter source code section 812 may be identified based on one or more symbols, characters, words, phrases, etc. included in the parameter source code 810. For example, the "# Data Start" comment included in the parameter source code 810 may be identified as a starting point of the problem-parameter source code section 812. Rows of source code below the starting point may be parsed to identify details associated with the problem parameters. In these and other embodiments, a first row following the starting point may identify a caption describing the problem parameters included in the problem-parameter source code section 812. The captions of the problem parameters may include labels for the problem parameters. In these and other embodiments, a given set of problem parameters may include a number of captions corresponding to the number of problem parameters in the given set. For example, the "Weights" label of the primary problem variables 822 is a caption for a first input variable included in the primary problem variables 822 based on a particular first row of source code stating "#! Weights." Additionally or alternatively, a second row may identify a data type for the described problem parameters, such as a list, a string, an integer, a Boolean, etc. Returning to the previous example, the first input variable labeled "Weights" may include a particular second row stating "#! list" indicating the first input variable includes a list data type.

A third row may identify one or more values corresponding to the described problem parameters. In some embodiments, the values may be included in the third row of the problem-parameter source code section 812 as one or more values corresponding to a number of variables. The values included in the third row may be reflected in the fillable form 820 in association with the corresponding primary problem variable 822. Additionally or alternatively, the variables included in the third row may include no values and/or values of null.

A user may input values in the fillable form 820. In some embodiments, the values associated with the variables included in the third row may be updated based on input to the fillable form 820 corresponding to the primary problem variable 822 such that the values input by the user update the parameter source code 810. Additionally or alternatively, the fillable form 820 may include the variables included in the third row having no values and/or values of null. Input to the fillable form 820 may replace the missing and/or null values associated with such variables.

Execution parameters may include inputs that describe setup of the environment in which a particular optimization problem may be solved. For example, execution parameters associated with a particular optimization problem to be solved using a digital annealing system may include specification of which digital annealing unit of a group of digital annealing units will be used, a Lagrange multiplier value, etc. In these and other embodiments, the execution parameters may include software parameters describing the setup of the environment, such as the designated digital annealing unit, and/or hardware parameters, such as the Lagrange multiplier value.

In some embodiments, primary problem variables 822 may be distinguished from execution problem variables 824 based on one or more symbols, characters, words, phrases, etc. included in the parameter source code 810. For example, execution problem variables 824 may be identified based on an asterisk symbol positioned before the data type comment in the second row of the parameter source code 810. As shown in execution-parameter source code section 814, a particular comment may state "#! *int", indicating the problem parameter is an execution problem variable 824 having an integer data type whereas a comment stating "#! int" instead indicates the problem parameter is a primary problem variable 822.

In some embodiments, a fourth row may be checked to determine whether the fourth row includes an ending point, such as a "# Data End" comment. Responsive to determining the fourth row includes the ending point, parsing of the problem-parameter source code section 812 may end. Responsive to determining the fourth row does not include the ending point, the fourth row may be treated in the same or a similar manner as the first row identifying the caption, and additional primary problem variables may be identified.

Figure 9:
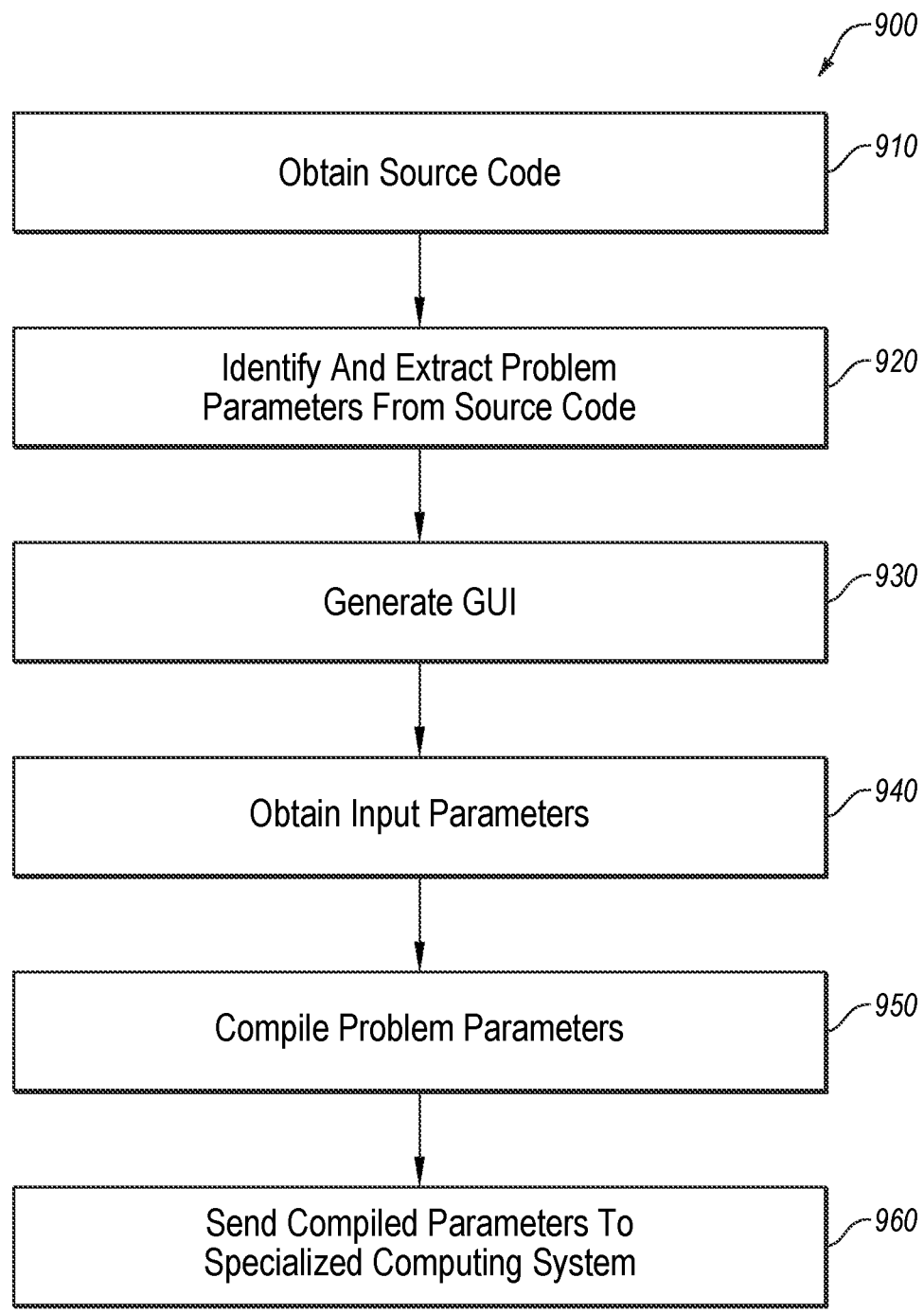
FIG. 9 is a flowchart of an example method of solving a particular optimization problem based on user-provided problem parameters that are provided via a GUI according to the present disclosure.

FIG. 9 is a flowchart of an example method 900 of solving a particular optimization problem based on user-provided problem parameters that are provided via a GUI (e.g., the GUI 140 of FIG. 1), according to the present disclosure. The method 900 may be performed by any suitable system, apparatus, or device. For example, the computing platform 110, the GUI 140, and/or the specialized computing system 170 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

At block 910, source code may be obtained. The obtained source code may include one or more problem parameters. In some embodiments, the source code may be written by a user, such as a user operating the advanced-user profile 524 and/or a user operating the administrative-user profile 526. In these and other embodiments, the source code may be obtained by a computing platform, such as the computing platform 110, capable of identifying the problem parameters included in the source code based on one or more symbols, characters, words, phrases, etc. as described above in relation to FIGS. 7A-7D and 8.

At block 920, the problem parameters may be extracted from the source code. Extraction of the problem parameters may be facilitated by a computing platform, such as the computing platform that identifies the problem parameters. In some embodiments, the extracted problem parameters may include the problem title 712, the problem description 714, the mathematical formulae 716, and/or the input parameters 718. Extraction of the problem parameters may be accomplished as described above in relation to FIGS. 7A-7D and 8. In some embodiments, one or more problem parameters for solving the optimization problem not included with the extracted problem parameters may be identified.

In these and other embodiments, the missing problem parameters may be identified based on variables included in one or more of the extracted mathematical formulae. For example, a particular mathematical formula may take a first variable, a second variable, and a third variable as inputs to calculate a fourth variable. The extracted problem parameters may include values for the first variable and the second variable, but a value may not be extracted for the third variable. In this example, the third variable may be identified as a missing problem parameter. Additionally or alternatively, the missing problem parameters may be identified based on values of the extracted problem parameters. For example, a first variable taking string inputs corresponding to a problem title, a second variable taking string inputs corresponding to a problem description, and a third variable taking integer input corresponding to an input parameter may have initial values of null. Problem parameters including new values for the first variable and the second variable may be extracted from a particular piece of source code such that the values of the first variable and the second variable are no longer null. The third variable may be identified as a missing problem parameter because the value of the third variable remained null.

At block 930, the GUI may be generated based on the extracted parameters. In some embodiments, the extracted problem parameters may be displayed by the GUI such that any user may view the extracted problem parameters. Additionally or alternatively, the extracted problem parameters may be displayed by the GUI such that users may only view some of the extracted problem parameters based on the level of access associated with a profile used to view the GUI. In these and other embodiments, the missing problem parameters may be displayed by the GUI such that a user may be prompted to provide the missing problem parameters.

In some embodiments, the GUI may provide a communal approach to solving optimization problems. For example, a first user may be working on a particular optimization problem. The particular optimization problem may be displayed by the GUI such that a second user may revise the particular optimization problem via the GUI. Revising the particular optimization problem by the second user may include editing source code corresponding to the particular optimization problem, changing problem parameters via the GUI, etc. and may be visible to the first user. The first user may provide additional input via the GUI relating to the particular optimization problem, which may result in automatic revisions to the source code associated with the particular optimization problem. Thus, the first user and the second user may collaboratively revise the particular optimization problem regardless of the technical expertise of either user. Revisions to the particular optimization problem may be recorded, such as in a revision log, such that the first user and/or the second user may review the revisions.

At block 940, input parameters may be provided by the user and obtained via the GUI. The user-provided input parameters may include values corresponding to the missing problem parameters. In some embodiments, users may input values corresponding to extracted problem parameters, and the user-provided values associated with the extracted problem parameters may overwrite previous values of the extracted problem parameters.

At block 950, the extracted parameters and the user-provided parameters may be compiled. In some embodiments, the extracted parameters and the user-provided parameters may be compiled as a file (e.g., compressed in a .zip file) capable of being sent to a specialized computing system.

At block 960, the compiled parameters may be sent to a specialized computing system. In some embodiments, the specialized computing system may determine a solution to a particular optimization problem based on the compiled parameters associated with the particular optimization problem, and the solution may be sent to the GUI such that a user operating the GUI may view the solution. Additionally or alternatively, the specialized computing system may send an error message to the GUI responsive to the specialized computing system failing to solve the optimization problem based on the compiled parameters. The error message may specify a reason for failure to solve the optimization problem, such as erroneous mathematical formulae, missing variables, etc.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
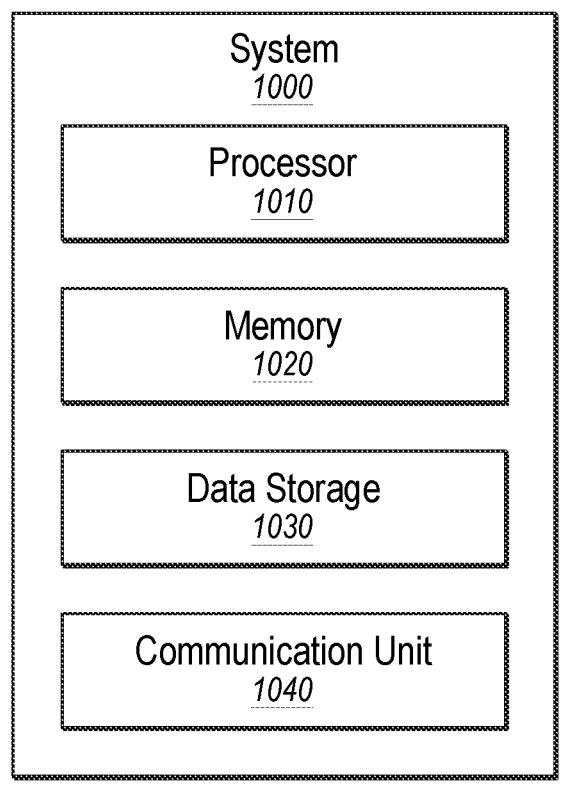
FIG. 10 is an example computing system.

FIG. 10 illustrates an example computing system 1000, according to at least one embodiment described in the present disclosure. The computing system 1000 may include a processor 1010, a memory 1020, a data storage 1030, and/or a communication unit 1040, which all may be communicatively coupled. Any or all of the system 100 of FIG. 1 may be implemented as a computing system consistent with the computing system 1000, including the computing platform 110 and/or the specialized computing system 170.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to perform the method 900 of FIG. 9. For example, the processor 1010 may obtain source code associated with an optimization problem, extract problem parameters from the source code, generate a GUI based on the extracted problem parameters, obtain user-provided parameters via the GUI, compile the extracted problem parameters and the user-provided parameters, and/or send the compiled problem parameters to a specialized computing system.

The memory 1020 and the data storage 1030 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1010. For example, the memory 1020 and/or the data storage 1030 may store obtained source code and/or extracted problem parameters (such as the source code 120 and/or the problem parameters 130 in FIG. 1). In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for carrying or having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining source code that describes a combinatorial optimization problem;
    identifying a plurality of problem parameters associated with solving the combinatorial optimization problem that enable a specialized computing system to solve the combinatorial optimization problem;
    extracting one or more first parameters of the plurality of problem parameters from the source code;
    executing the source code including the one or more first parameters;
    identifying one or more second parameters relating to the combinatorial optimization problem of the plurality of problem parameters that are not included in the source code based on execution of the source code;
    prompting, via a graphical user interface (GUI), a user for input relating to the one or more second parameters;
    obtaining, via the GUI, the input that includes the second parameters;
    compiling the extracted first parameters and the user-provided second parameters as input parameters associated with the combinatorial optimization problem;
    providing the input parameters to the specialized computing system such that the specialized computing system is able to solve the combinatorial optimization problem;
    obtaining revised source code to generate an updated combinatorial optimization problem solvable by the specialized computing system, the source code having been revised by the user;
    extracting updated problem parameters describing the updated combinatorial optimization problem from the revised source code;
    updating the GUI based on the updated problem parameters;
    obtaining, by the GUI, second user-provided problem parameters relating to the updated combinatorial optimization problem; and
    solving, by the specialized computing system, the updated combinatorial optimization problem based on the second user-provided problem parameters.

2. The method of claim 1, wherein the plurality of problem parameters associated with solving the combinatorial optimization problem include at least one of a problem title, a problem description, a mathematical formula, or a problem variable.

3. The method of claim 2, wherein the problem variable includes primary problem variables and execution problem variables, wherein:
    the primary problem variables include one or more input variables corresponding to the combinatorial optimization problem; and
    the execution problem variables describe an environment for solving the combinatorial optimization problem.

4. The method of claim 1, wherein prompting the user for input via the GUI comprises: designating a profile for the user interacting with the GUI, the profile identifying a level of access to the obtained source code; and
    displaying the GUI based on the designated profile for the user.

5. The method of claim 4, wherein the profile for the user includes:
    a first profile, wherein the user having the first profile has access to one or more webpages displayed via the GUI;
    a second profile, wherein the user having the second profile has access to the source code; and
    a third profile, wherein the user having the third profile has access to profile editing for one or more of the users.

6. The method of claim 1, wherein obtaining the source code describing the combinatorial optimization problem comprises:
    identifying one or more code templates describing the combinatorial optimization problem based on initial input from the user describing the combinatorial optimization problem;
    providing the code templates to a second user; and
    obtaining the source code describing the combinatorial optimization problem, wherein the source code is generated by the second user.

7. The method of claim 1, wherein obtaining the input that includes the second parameters comprises:
    obtaining, from one or more second users, collaborative input, wherein the collaborative input includes at least one of: updated source code describing the combinatorial optimization problem, one or more updated first parameters, or one or more updated second parameters;
    compiling the extracted first parameters, the user-provided second parameters, and the collaborative input as input parameters of the specialized computing system; and providing the input parameters to the specialized computing system such that the specialized computing system is able to solve the combinatorial optimization problem.

8. The method of claim 1, wherein the specialized computing system is a digital-annealing system.

9. The method of claim 1, wherein:
the source code includes one or more symbols, each of the symbols corresponding to one or more of the problem parameters; and
identifying the plurality of problem parameters associated with solving the combinatorial optimization problem comprising parsing the source code based on the symbols.

10. One or more non-transitory computer-readable storage media configured to store instructions that, in response to being executed, cause a system to perform operations, the operations comprising:
obtaining source code that describes a combinatorial optimization problem;
identifying a plurality of problem parameters associated with solving the combinatorial optimization problem that enable a specialized computing system to solve the problem;
extracting one or more first parameters of the plurality of problem parameters from the source code;
identifying one or more second parameters relating to the combinatorial optimization problem of the plurality of problem parameters that are not included in the source code;
prompting, via a graphical user interface (GUI), a user for input relating to the one or more second parameters;
obtaining, via the GUI, the input that includes the second parameters;
compiling the extracted first parameters and the user-provided second parameters as input parameters associated with the combinatorial optimization problem;
providing the input parameters to the specialized computing system such that the specialized computing system is able to solve the combinatorial optimization problem;
obtaining revised source code to generate an updated combinatorial optimization problem solvable by the specialized computing system, the source code having been revised by the user;
extracting updated problem parameters describing the updated combinatorial optimization problem from the revised source code;
updating the GUI based on the updated problem parameters;
obtaining, by the GUI, second user-provided problem parameters relating to the updated combinatorial optimization problem; and
solving, by the specialized computing system, the updated combinatorial optimization problem based on the second user-provided problem parameters.

11. The one or more non-transitory computer-readable storage media of claim 10, wherein the plurality of problem parameters associated with solving the combinatorial optimization problem include at least one of a problem title, a problem description, a mathematical formula, or a problem variable.

12. The one or more non-transitory computer-readable storage media of claim 11, wherein the problem variable includes primary problem variables and execution problem variables, wherein:

the primary problem variables include one or more input variables corresponding to the combinatorial optimization problem; and
the execution problem variables describe an environment for solving the combinatorial optimization problem.

13. The one or more non-transitory computer-readable storage media of claim 10, wherein prompting the user for input via the GUI comprises:
designating a profile for the user interacting with the GUI, the profile identifying a level of access to the obtained source code; and
displaying the GUI based on the designated profile for the user.

14. The one or more non-transitory computer-readable storage media of claim 13, wherein the profile for the user includes:
a first profile, wherein the user having the first profile has access to one or more webpages displayed via the GUI;
a second profile, wherein the user having the second profile has access to the source code; and
a third profile, wherein the user having the third profile has access to profile editing for one or more of the users.

15. The one or more non-transitory computer-readable storage media of claim 10, wherein obtaining the source code describing the combinatorial optimization problem comprises:
identifying one or more code templates describing the combinatorial optimization problem based on initial input from the user describing the combinatorial optimization problem;
providing the code templates to a second user; and
obtaining the source code describing the combinatorial optimization problem, wherein the source code is generated by the second user.

16. The one or more non-transitory computer-readable storage media of claim 10, wherein obtaining the input that includes the second parameters comprises:
obtaining, from one or more second users, collaborative input, wherein the collaborative input includes at least one of: updated source code describing the combinatorial optimization problem, one or more updated first parameters, or one or more updated second parameters;
compiling the extracted first parameters, the user-provided second parameters, and the collaborative input as input parameters of the specialized computing system; and
providing the input parameters to the specialized computing system such that the specialized computing system is able to solve the combinatorial optimization problem.

17. The one or more non-transitory computer-readable storage media of claim 10, wherein the specialized computing system is a digital-annealing system.

18. The one or more non-transitory computer-readable storage media of claim 10, wherein:
the source code includes one or more symbols, each of the symbols corresponding to one or more of the problem parameters; and
identifying the plurality of problem parameters associated with solving the combinatorial optimization problem comprising parsing the source code based on the symbols.

* * * * *